US010766712B2

(12) United States Patent
DeWitt et al.

(10) Patent No.: US 10,766,712 B2
(45) Date of Patent: Sep. 8, 2020

(54) MATERIAL HANDLING APPARATUS WITH DELIVERY VEHICLES AND RECIRCULATION

(71) Applicant: Opex Corporation, Moorestown, NJ (US)

(72) Inventors: Robert R. DeWitt, Marlton, NJ (US); Alexander Stevens, Philadelphia, PA (US); Monty McVaugh, Mount Holly, NJ (US); James Walsh, Pittsford, NY (US); Gregory Wilson, Moorestown, NJ (US)

(73) Assignee: OPEX Corporation, Moorestown, NJ (US)

( * ) Notice: Subject to any disclaimer, the term of this patent is extended or adjusted under 35 U.S.C. 154(b) by 0 days.

(21) Appl. No.: 16/747,265

(22) Filed: Jan. 20, 2020

(65) Prior Publication Data
US 2020/0152259 A1 May 14, 2020

Related U.S. Application Data

(63) Continuation of application No. 16/669,003, filed on Oct. 30, 2019, which is a continuation of application
(Continued)

(51) Int. Cl.
*B07C 3/08* (2006.01)
*B65G 43/08* (2006.01)
(Continued)

(52) U.S. Cl.
CPC ............. *B65G 43/08* (2013.01); *B07C 3/082* (2013.01); *B65G 1/0485* (2013.01); *B65G 1/1373* (2013.01); *B65G 2203/044* (2013.01)

(58) Field of Classification Search
CPC .. B07C 3/06; B07C 3/065; B07C 3/08; B07C 3/082; B07C 3/085; B07C 5/361;
(Continued)

(56) References Cited

U.S. PATENT DOCUMENTS 3,884,370 A * 5/1975 Bradshaw ............... B07C 3/087
                                                                198/350
4,244,672 A * 1/1981 Lund ........................ B07C 3/02
                                                                198/349.7
(Continued)

FOREIGN PATENT DOCUMENTS

| AU | 2014216046 | 9/2014 |
| CA | 1242986 | 10/1988 |
| WO | 01/10574 | 2/2001 |

OTHER PUBLICATIONS

International Search Report issued in PCT Application No. PCT/US17/13077 dated Jun. 28, 2017.
(Continued)

*Primary Examiner* — Joseph C Rodriguez
(74) *Attorney, Agent, or Firm* — Stephen H. Eland

(57) ABSTRACT

A method and apparatus are provided for sorting items to a plurality of sort destinations. The items are fed into the apparatus at an input station having a scanning station. The scanning station evaluates one or more characteristics of each item. The items are then loaded onto one of a plurality of independently controlled delivery vehicles. The delivery vehicles are individually driven to sort destinations. Once at the appropriate sort destination, the delivery vehicle ejects the item to the sort destination and returns to receive another item to be delivered. A re-induction conveyor may be provided for receiving select items from the vehicles and conveying the items back to the input station for re-processing. Additionally, a controller is provided to control the movement of the vehicles based on a characteristic of each
(Continued)

item being delivered by each vehicle. The system may also include vehicles having an assembly for detecting items being loaded onto or discharged from the vehicles.

16 Claims, 10 Drawing Sheets

Related U.S. Application Data

No. 15/586,247, filed on May 3, 2017, now Pat. No. 10,494,192, which is a continuation of application No. PCT/US2017/013077, filed on Jan. 11, 2017.

(60) Provisional application No. 62/374,218, filed on Aug. 12, 2016, provisional application No. 62/331,020, filed on May 3, 2016, provisional application No. 62/277,253, filed on Jan. 11, 2016.

(51) Int. Cl.
*B65G 1/137* (2006.01)
*B65G 1/04* (2006.01)

(58) Field of Classification Search
CPC ... B07C 5/362; B07C 5/38; B07C 2301/0041; B07C 2301/0083; B65G 1/0414; B65G 1/0478; B65G 1/0492; B65G 1/1373; B65G 47/42; B65G 43/08
See application file for complete search history.

(56) References Cited

U.S. PATENT DOCUMENTS

| | | | |
|---|---|---|---|
| 6,264,042 B1 | 7/2001 | Cossey, Jr. et al. | |
| 6,652,213 B1* | 11/2003 | Mitchell | B65G 1/0492 414/279 |
| 6,953,906 B2* | 10/2005 | Burns | B07C 1/02 198/347.1 |
| 7,235,756 B2* | 6/2007 | De Leo | B07C 3/087 198/358 |
| 7,591,630 B2* | 9/2009 | Lert, Jr. | B65G 1/0492 414/807 |
| 8,104,601 B2* | 1/2012 | Hayduchok | B07C 3/087 198/347.1 |
| 8,457,781 B2* | 6/2013 | Bailey | B07C 3/00 700/224 |
| 8,480,347 B2* | 7/2013 | Schafer | B65G 1/1378 414/266 |
| 8,766,128 B2* | 7/2014 | Stemmle | B07C 3/00 209/584 |
| 8,952,284 B1* | 2/2015 | Wong | B07C 5/3412 209/586 |
| 9,687,883 B2* | 6/2017 | Hayduchok | B07C 7/02 |
| 9,694,975 B2* | 7/2017 | Lert | B65G 1/1373 |
| 9,776,794 B2* | 10/2017 | Sullivan | B65G 1/1371 |
| 9,796,395 B2* | 10/2017 | Tasaka | B61B 13/04 |
| 9,815,625 B2* | 11/2017 | DeWitt | B65G 1/1373 |
| 9,862,543 B2* | 1/2018 | Toebes | B65G 1/0492 |
| 2003/0038065 A1* | 2/2003 | Pippin | B07C 3/02 209/584 |
| 2003/0141226 A1* | 7/2003 | Morikawa | B07C 5/18 209/584 |
| 2011/0094854 A1* | 4/2011 | Hayduchok | B61C 11/04 198/370.1 |

OTHER PUBLICATIONS

International Preliminary Report on Patentability issued in International Application No. PCT/US17/13077 dated Jul. 17, 2018.

* cited by examiner

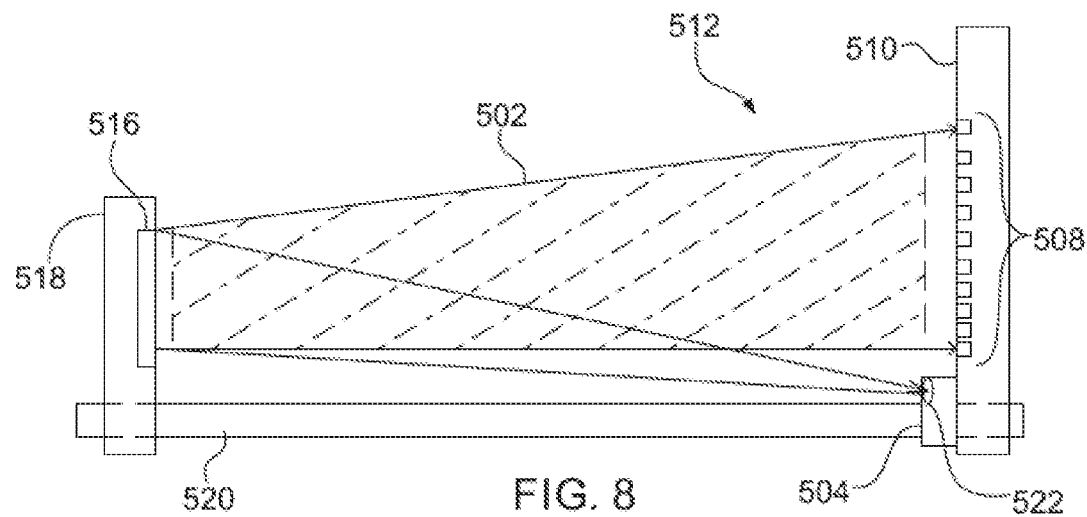
FIG. 8
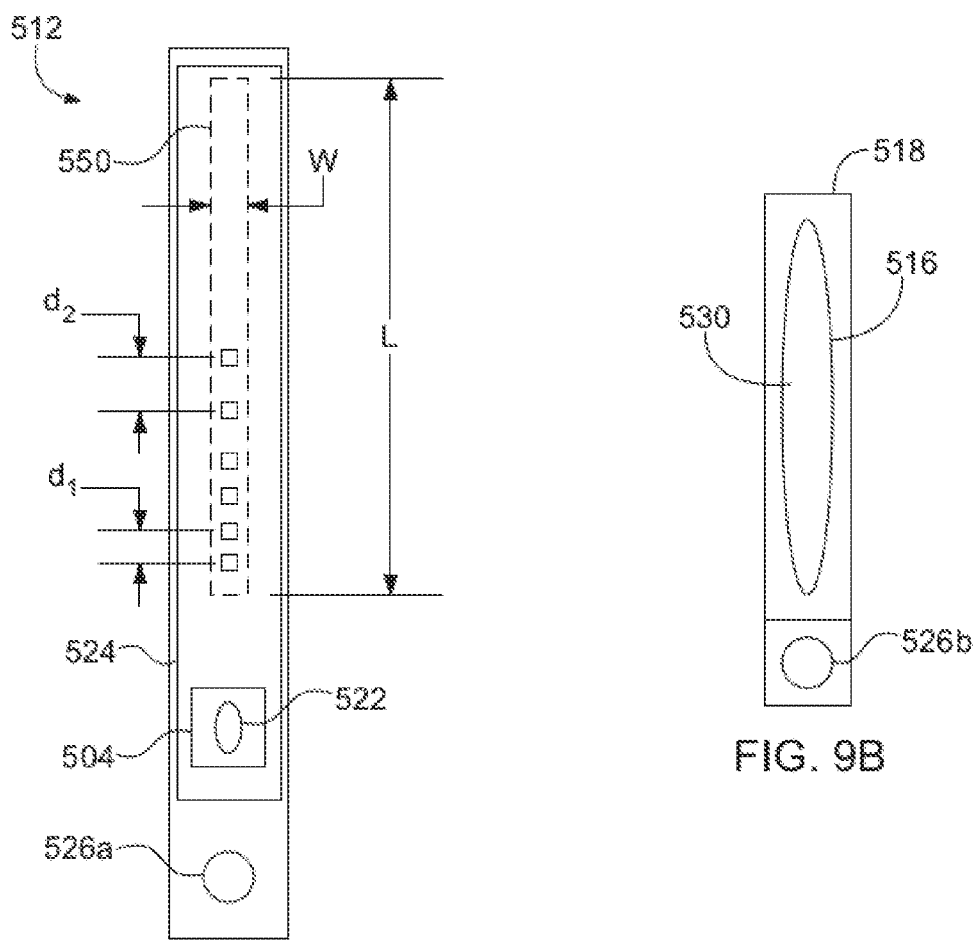
FIG. 9A
FIG. 9B

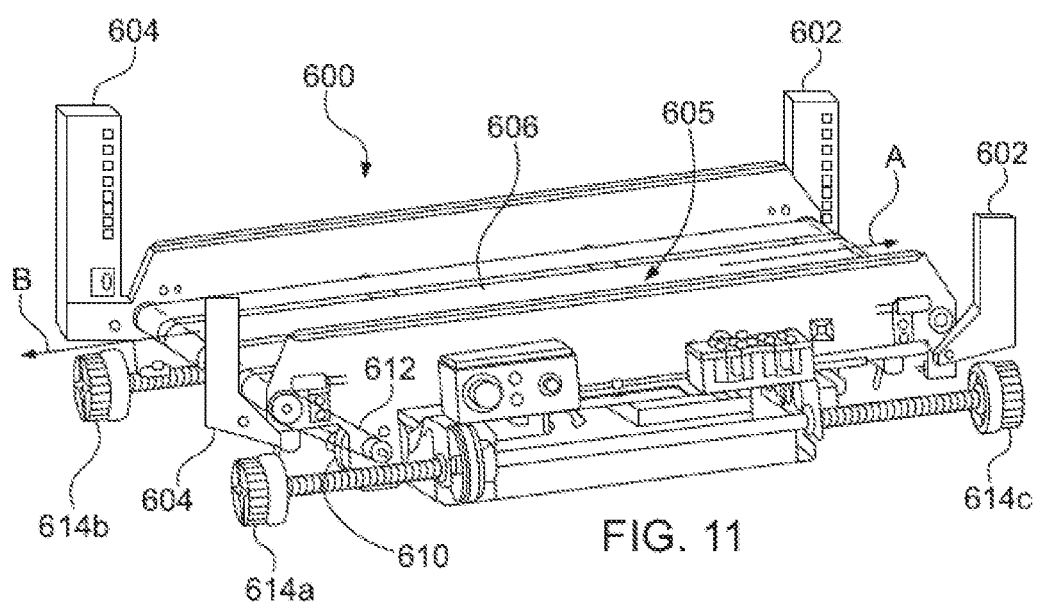

MATERIAL HANDLING APPARATUS WITH DELIVERY VEHICLES AND RECIRCULATION

PRIORITY CLAIM

This application is a continuation of U.S. patent application Ser. No. 16/669,003 filed Oct. 30, 2019, which is a continuation of U.S. patent application Ser. No. 15/586,247 filed May 3, 2017, now issued as U.S. Pat. No. 10,494,192, which is a continuation of International Patent Application No. PCT/US17/13077 filed Jan. 11, 2017, which claims priority to U.S. Provisional Patent Application No. 62/277,253, filed Jan. 11, 2016, U.S. Provisional Patent Application No. 62/331,020, filed May 3, 2016 and U.S. Provisional Patent Application No. 62/374,218, filed Aug. 12, 2016. The entire disclosure of each of the foregoing applications is hereby incorporated herein by reference.

FIELD OF THE INVENTION

The present invention relates to a material handling system and in particular to a system operable to receive and sort items using a plurality of automated vehicles.

BACKGROUND OF THE INVENTION

Sorting and retrieving items to fill a customer order can be a laborious and time consuming. Similarly, may large organizations have extensive storage areas in which numerous items are stored. Sorting and retrieving items from the hundreds or thousands of storage areas requires significant labor to perform manually. In many fields, automated picking has developed to reduce labor cost and improve customer service by reducing the time it takes to fill a customer order. However, the known systems of automatically handling the materials are either very expensive or have limitations that hamper their effectiveness. Accordingly, there is a need in a variety of material handling applications for automatically storing and/or retrieving items.

Additionally, in conveyor or sorter systems, objects are generally transferred to or from a conveyor and/or from one conveyor to another (e.g., from a feed conveyor to a receiving conveyor). In many automated material handling systems, such transfers take place only after the object has reached a specific location (e.g., an object storage and/or retrieval location) along the conveying path. The capacity of a material handling system is determined, among other things, by the rate at which each object is transferred to and/or from the applicable location.

In some material handling systems, a conveyor may form part of a movable vehicle used to transport objects to, or retrieve the objects from, the location where a transfer operation is performed. In material systems of this type, failure to rapidly and accurately determine that an object has been transferred from or to the conveyor may delay (or prevent) the vehicle from advancing to the next location.

SUMMARY OF THE INVENTION

The Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

The invention provides a number of aspects that may form part of a material handling system. The system may include one or more of a number of aspects of the invention as further described below.

According to one aspect, the invention may provide an apparatus for sorting a plurality of items is provided. The apparatus includes a plurality of sort destinations and a plurality of a plurality of delivery vehicles for delivering items to the sort destinations. A controller is provided for providing signals for controlling operation of the vehicles. A database for storing a plurality of vehicle movement profiles is also provided. In response to a characteristic determined for an item, the central controller retrieves a vehicle movement profile and the central controller controls the movement of the vehicle in response to the retrieved vehicle movement profile. The vehicle movement profile may comprise one or more of the following: acceleration, deceleration and cornering speed.

According to another aspect, the invention may comprise a track system for guiding the delivery vehicles to the sort destinations.

According to another aspect, the invention may comprise a scanner for scanning an item to detect a characteristic of each item, wherein the detected characteristic is the characteristic determined for an item that the controller uses to retrieve a vehicle movement profile. The detected characteristic may be a product identification code for the item.

According to yet another aspect, the detected characteristic may be one of the length, width, height, weight or shape of the item.

According to another aspect, the invention provides an apparatus for sorting a plurality of items to a plurality of sort destinations and a plurality of delivery vehicles for delivering items to the sort destinations. The apparatus may include a controller for providing signals for controlling operation of one of the vehicle carrying one of the items to one of the sort destinations. In response to a characteristic determined for an item the central controller may control the operation of the vehicle so that the position of the vehicle relative to the sort destination varies in response to the determined characteristic.

According to a further aspect, the invention provides sort destination in the form of an output bin having a rearward end through which the item is discharged into the output bin.

According to another aspect of the invention an output bin for a material handling system may comprise an open rearward end.

According to another aspect of the invention an output bin for a material handling system may comprise a displaceable or collapsible rearward wall.

According to another aspect of the invention a method is provided for sorting a plurality of items. The method may include the step of loading an item onto a vehicle to be delivered to an output bin and driving the vehicle to the output bin. The method may further include the steps of discharging the item from the vehicle into the output bin and monitoring the position of the item on the vehicle. The method may also include the step of controlling operation of the vehicle based on the step of monitoring the position of the item, wherein the step of controlling operation of the vehicle comprises controlling the vehicle to attempt to move the item to a desired location on the vehicle.

According to a further aspect, the invention provides a method including the step of driving a vehicle along a guide. The guide may comprise a surface and the vehicle may comprises a rotatable element, so that the step of driving a vehicle along a guide comprises driving the rotatable element along the surface of the guide. The step of driving the vehicle may comprise driving the vehicle in a vertical direction.

According to another aspect, the invention includes a method for sorting items using a plurality of vehicles, including the step of controlling the acceleration or deceleration of a vehicle to control the position of an item on the vehicle.

According to a further aspect of the invention, a method for sorting items using vehicles includes the step of driving a conveyor belt of the vehicle to displace the item on the vehicle while the vehicle is moving along a track.

According to another aspect, the invention provides a method for sorting items using a plurality of vehicles including the step continuously monitoring the position of an item on a vehicle as the vehicle travels to the output bin.

In another aspect, the invention provides an apparatus for sorting a plurality of items that includes a plurality of delivery vehicles guided by a track to deliver items to one or more destination. The apparatus may include a loading station for loading items onto the vehicles. The items may be analyzed to detect a first characteristic before the items are loaded onto a vehicle. A recirculation system may be provided for recirculating items to an input station from a point along the track.

In another aspect, the invention provides an apparatus for sorting a plurality of items that includes a plurality of delivery vehicles guided by a track to deliver items to one or more destination and the apparatus having a qualification station for detecting first and second characteristics of items to be delivered by the vehicles before the items are loaded onto the vehicles at a loading station. The system may include a recirculation path providing a path along which the items can be transported along the track. The recirculation path may have a first end and a second end and the first end may be positioned vertically higher than the second end. The second end may be positioned adjacent the input station so that items placed on the first end of the recirculation pathway tend to move downwardly toward the second end adjacent the input station.

According to another aspect, the invention provides an apparatus for sorting a plurality of items and the apparatus may include a reject area positioned vertically lower than a first end of a recirculation path. The recirculation path may be a roller bed. The recirculation path may be a chute or slide. The recirculation path may comprise a conveyor including one or more moveable belts or belt links.

According to a further aspect, the invention provides a sorting apparatus having a controller for controlling operation of delivery vehicles, wherein in response to signals received from by a scanning station regarding a first characteristic for an item, a vehicle is directed to an entrance to a recirculation path where the controller controls the vehicle to discharge the item onto the recirculation path. The recirculation path may convey the item back to an input station. At the input station the item may be re-processed at a qualification station. Additionally, in response to signals from the scanning station regarding a second characteristic the item is directed to a reject area.

According to another aspect of the invention a sorting apparatus is provided in which in response to signals from a qualification station a controller controls a vehicle to direct the vehicle to the one of the destination areas.

According to another aspect, the invention provides a method for sorting a plurality of items that includes scanning items and selectively elevating items above an input area based on scanned characteristics. The method may also include the step of selectively conveying items down a re-circulation path to the input area after the step of selectively elevating items. The method may include the step of selectively sorting items after the step of selectively elevating items.

According to another aspect, the method may include the step of moving items to the input area. The method may also include the step of scanning the items to detect a first characteristic of the item. Optionally, the system may include the step of scanning the item to detect a second characteristic of the item. The system may include the step of selectively directing items to a reject area based on the step of scanning the items to detect a first characteristic or the step of scanning the items to detect a second characteristic.

According to another aspect, the step of selectively elevating items may be based on the step of scanning the items to detect a first characteristic or the step of scanning the items to detect a second characteristic. Optionally, the step of selectively conveying items down a re-circulation path may be based on the step of scanning the items to detect a first characteristic or the step of scanning the items to detect a second characteristic. Additionally, the step of selectively sorting the items to one or more destinations may be based on the step of scanning the items to detect a first characteristic and the step of scanning the items to detect a second characteristic.

Systems and methods are described for aiding in the reliable and accurate sensing of an object boundary such, for example, as the leading and/or trailing edge surface(s) of an object relative to an underlying conveyor surface. According to one or more embodiments, a sensing arrangement for sensing an object boundary location relative to an underlying object support surface comprises a plurality of photodetector elements disposed in a linear array; a laser light source; and a lens system dimensioned and arranged to receive optical energy from the laser light source and to collimate the received optical energy into a line aligned with the plurality of photodetector elements. Optical energy of the line is received by each photodetector element of the plurality of photodetector elements unless an amount of optical energy above a sensitivity threshold is absorbed, reflected or refracted by an object disposed on the underlying support surface.

In another embodiment, a system for conveying objects along a conveying path defines an object support surface and includes an object transfer mechanism operative to move an object, supported by the object support surface, in at least one object transfer direction; and a sensing arrangement for sensing an intersection between an object and a detection plane transverse and a detection plane, the sensing arrangement including a plurality of photodetector elements disposed in a linear array; a laser light source; and a lens system dimensioned and arranged to receive optical energy from the laser light source and to collimate the received optical energy into a line aligned with the plurality of photodetector elements, wherein optical energy of the line is received by each photodetector element of the plurality of photodetector elements unless an amount of optical energy above a sensitivity threshold is absorbed, reflected or refracted by an object disposed on the object support surface.

In yet another embodiment, a vehicle for conveying objects along a conveying path in a material handling system comprises first and second shafts extending in a direction transverse and orthogonal to an object transfer direction; a conveyor belt supported by the pair of shafts, the conveyor belt defining an object support surface; an electric motor for driving at least one of the shafts and causing movement of the conveyor belt and any object disposed on the object support surface following movement of the vehicle along the conveying path to an object transfer location; a sensing arrangement for sensing an object boundary location relative to the object support surface, the sensing arrangement including a plurality of photodetector elements disposed in a linear array; a laser light source; and a lens system dimensioned and arranged to receive optical energy from the laser light source and to collimate the received optical energy into a line aligned with the plurality of photodetector elements. Optical energy of the line is received by each photodetector element of the plurality of photodetector elements unless an amount of optical energy above a sensitivity threshold is absorbed, reflected or refracted by an object disposed on the object support surface.

In some embodiments, a vehicle for conveying objects along a conveying path in a material handling system comprises a pair of shafts comprising a first shaft and a second shaft extending in a direction transverse to an object transfer direction; a conveyor belt supported by the pair of shafts, the conveyor belt defining an object support surface; an electric motor for driving at least one of the shafts and causing movement of the conveyor belt and any object disposed on the object support surface following movement of the vehicle along the conveying path to an object transfer location, a first sensing arrangement disposed adjacent the first shaft for sensing a first object boundary relative to the object support surface, and a second sensing arrangement adjacent to second shaft for sensing a second object boundary location relative to the object support surface. Each of the first and second sensing arrangements includes a plurality of photodetector elements disposed in a linear array, a laser light source, and a lens system dimensioned and arranged to receive optical energy from a respective laser light source and to collimate the received optical energy into a line aligned with a corresponding plurality of photodetector elements.

BRIEF DESCRIPTION OF THE DRAWINGS

The foregoing summary and the following detailed description of the preferred embodiments of the present invention will be best understood when read in conjunction with the appended drawings, in which:

FIG. 8 is a front view, in elevation, depicting an object sensing arrangement;

FIG. 9A depicts a linear array of photodetector elements and collimated source of optical energy mounted on a common support structure and forming part of an object sensing arrangement of the object sensing arrangement of FIG. 8;

FIG. 9B depicts a reflecting mirror forming alignable with the common support structure of FIG. 9A;

FIG. 11 is a perspective view of an alternate vehicle a material handling system.

DETAILED DESCRIPTION OF THE INVENTION

Some portions of the detailed description which follow are presented in terms of operations on binary digital signals stored within a memory of a specific apparatus or special purpose computing device or platform. In the context of this particular specification, the term specific apparatus or the like includes a general purpose computer once it is programmed to perform particular functions pursuant to instructions from program software. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these or similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

Reference will now be made in detail to exemplary embodiments of the present invention, examples of which are illustrated in the accompanying drawings. Wherever possible, the same reference numbers will be used throughout the drawings to refer to the same or like parts.

Figure 1:
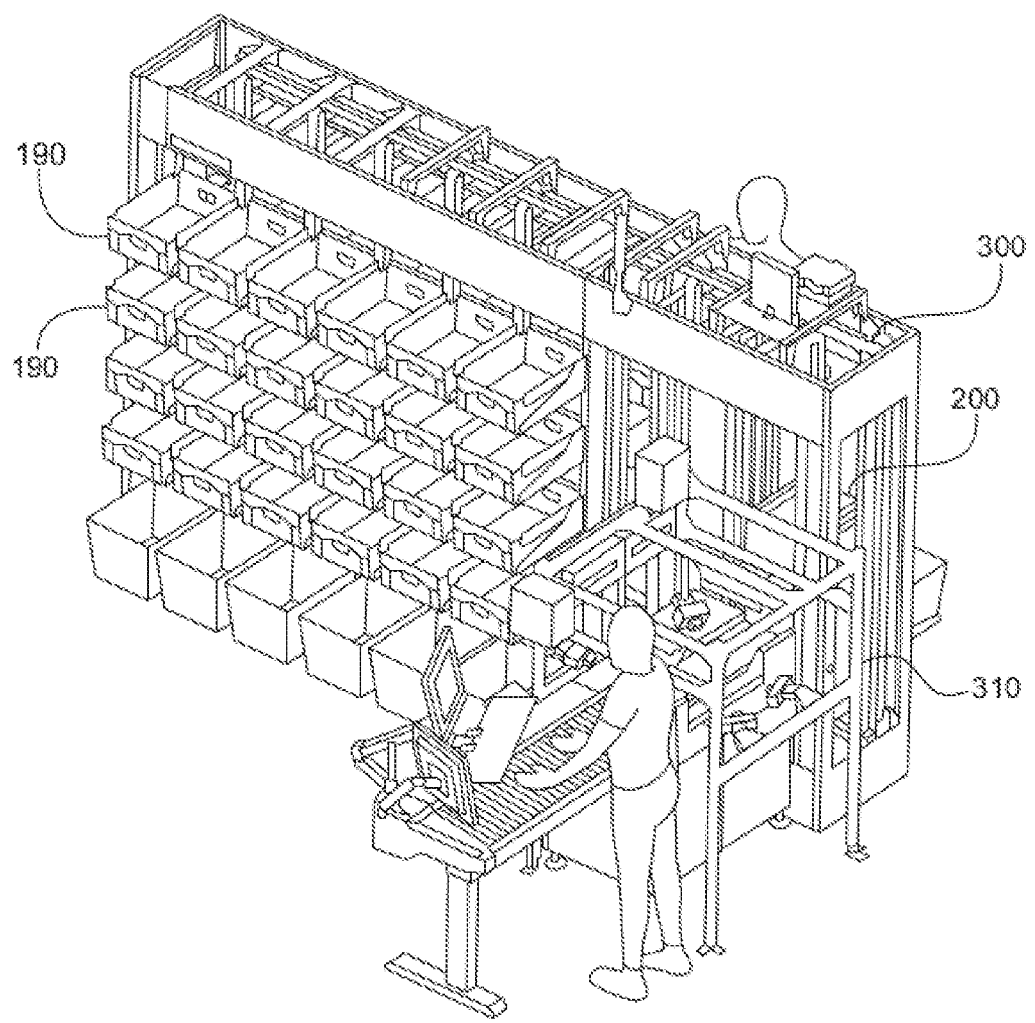
FIG. 1 is a perspective view of a material handling apparatus.
Figure 2:
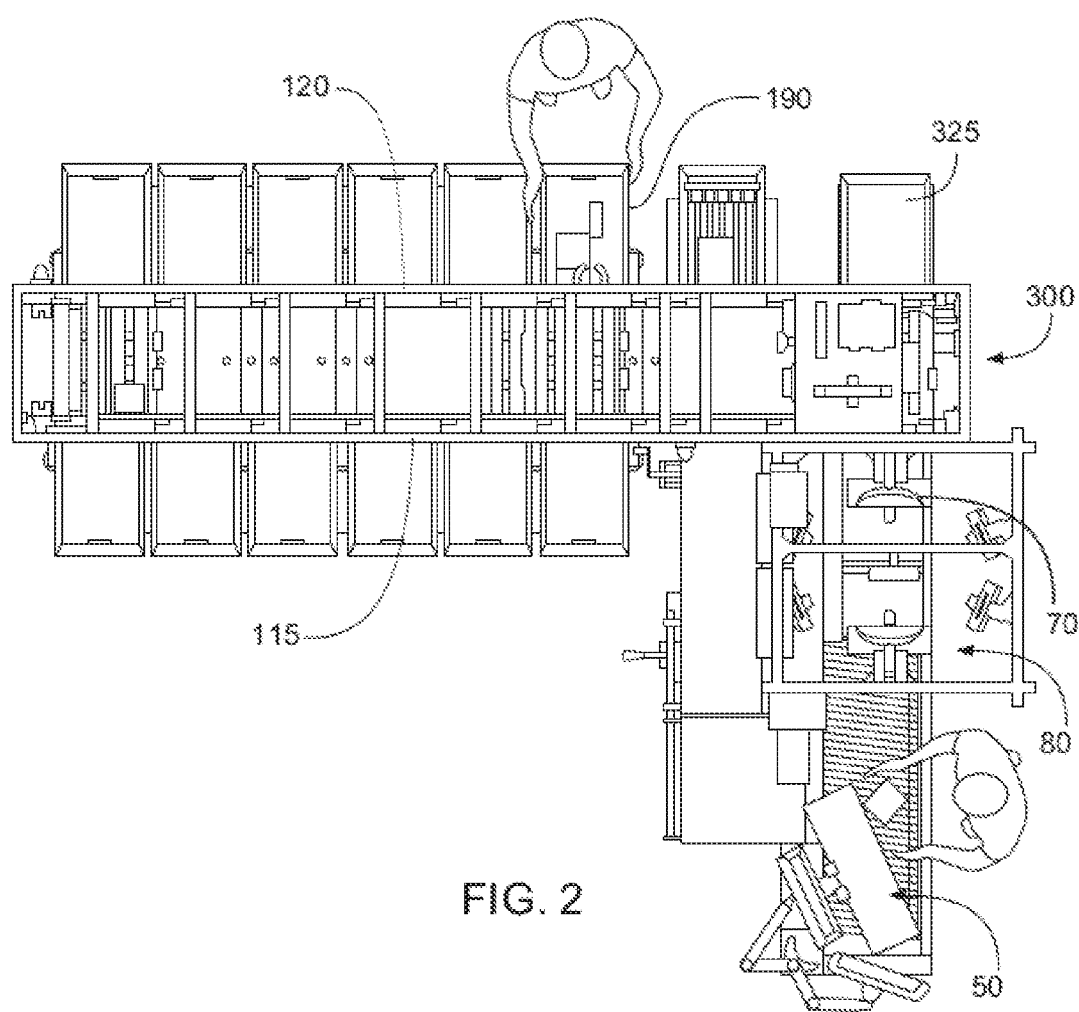
FIG. 2 is a plan view of the material handling system illustrated in FIG. 1.
Figure 3:
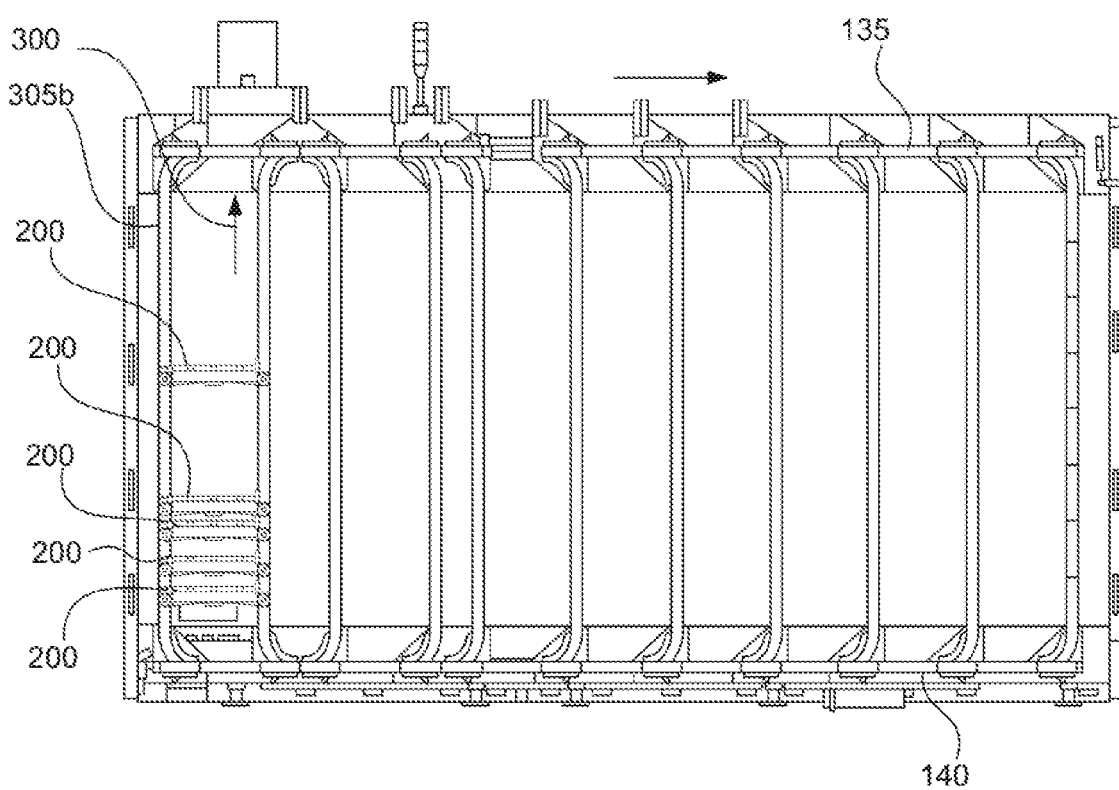
FIG. 3 is a side elevation view of one side of the track of the material handling system illustrated in FIG. 2.

Referring now to FIGS. 1-3, an apparatus for sorting items is designated generally 10. The apparatus 10 includes a plurality of delivery vehicles 200 that travel along a track system 100 to deliver items to a plurality of destinations or sort locations, such as output bins 190. Items are loaded onto the vehicles at a loading station 310 so that each vehicle receives an item to be delivered to a sort location. An inductions station 50 serially feeds items to the loading station 310. One or more characteristic of each item can be used to control the processing of the items as the vehicles move along the track 100 to the output bins. The characteristic(s) of each item may be known from each item or the characteristic(s) may be acquired by the system as the system processes the item. For instance, the induction station 50 may include one or more scanning elements for detecting one or more characteristic of the item.

From the loading station 310, the vehicles 200 travel along a track 110 to the destinations. The track may include a horizontal upper rail 135 and a horizontal lower rail 140, which operates as a return leg. A number of parallel vertical track legs 130 may extend between the upper rail and the lower return leg. The bins 190 may be arranged in columns between the vertical track legs 130.

The vehicles 200 are semi-autonomous vehicles that may have an onboard power source and an onboard motor to drive the vehicles along the track 110. The vehicles may include a loading/unloading mechanism 210, such as a conveyor, for loading pieces onto the vehicles and discharging the pieces from the vehicles.

Since the system 10 includes a number of vehicles 200, the positioning of the vehicles is controlled to ensure that the different vehicles do not crash into each other. In one embodiment, the system 10 uses a central controller 350 that tracks the position of each vehicle 200 and provides control signals to each vehicle to control the progress of the vehicles along the track. The central controller 350 may also control operation of the various elements along the track, such as the gates 180.

The following description provides details of the various elements of the system, including the induction station 50, the track system 100 and the vehicles 200. The manner in which the system operates will then be described. In particular, the manner in which the items are delivered may be controlled based on the characteristics of the items.

Induction Station

At the induction station 50, items are inducted into the system by serially loading items onto the vehicles 200. Since characteristics of the items may be used to control the operation of the vehicles, the system needs to know the characteristics. In one instance, the characteristics may be stored in a central database so that the characteristics are known and the system tracks the progress of the items so that the identification of the item is known as the item reaches the induction station 50. In this way, since the identification of the item is known the system 10 can retrieve data regarding the characteristics of the item, which are stored in the database. Alternatively, the items are scanned at the induction station 50 to identify one or more characteristic of each item.

In one embodiment, each item is manually scanned at the induction station to detect one or more features of the item. Those features are used to ascertain the identification of the item. Once the item is identified, various characteristics of the item may be retrieved from a central database and the item may be subsequently processed based on the known characteristics of the item. For instance, the induction station 50 may include a scanning station 80 that scans for a product code, such as a bar code. Once the product code is determined, the system retrieves information regarding the product from a central database. This information is then used to control the further processing of the item as discussed further below.

In a second embodiment, the items are scanned at the induction station 50 to detect various physical characteristics of the items. For instance, the induction station 50 may measure characteristics such as the length, height and/or width of an item. Similarly, the weight or shape of the item may be detected. These characteristics may be manually or automatically detected at the induction station. For instance, a series of sensors may be used to detect the length of an item and a scale can be used to automatically weigh an item. Alternatively, an operator may analyze each item and enter information regarding each item via an input mechanism, such as a mouse, keyboard or touchscreen. For instance, the system may include a touchscreen that includes one or more questions or options. One example would be the packaging: is the item in a plastic bag, a blister pack or loose? Is the item flat, cylindrical or round? The system may include default characteristics so that the operator only needs to identify the characteristics for an element if the element has characteristics that vary from the default values. For instance, the default characteristic for items may be flat or rectangular. If an item is rounded (e.g. spherical or cylindrical) the operator inputs information indicating that the item is rounded and the item is subsequently processed accordingly. Based on the detected information the item is processed accordingly.

As noted above, a variety of configurations may be used for the input station, including manual or automatic configurations or a combination of manual and automated features. In a manual system, the operator enters information for each item and the system delivers the item accordingly. In an automatic system, the input system 50 includes elements that scan each item and detect information regarding each item. The system then delivers the item according to the scanned information.

In an exemplary manual configuration, the input system includes a work station having a conveyor, an input device, such as a keyboard, and a monitor. The operator reads information on the item, such as an ID tag, inputs information from the tag into the system using the keyboard or other input device and then drops in onto a conveyor. The conveyor then conveys the piece to the loading station 310. For instance, the operator may visually read information marked on the item or the operator may use an electronic scanner, such as a bar code reader, to read a bar code or other marking on the item. Sensors positioned along the conveyor may track the piece as the conveyor transports the item toward the loading station.

Alternatively, as shown in FIGS. 1-4, the induction station 50 may include a scanning station 80 for automatically detecting characteristics of the items. Specifically, the induction station 50 may include an input conveyor 55 for receiving items and conveying the items to a scanning station 80 operable to detect one or more physical characteristics of an item. From the scanning station 80, a feed conveyor 70 conveys the item to the loading station 310 where the item is either loaded onto one of the vehicles 200 or passed through to a reject bin 325.

The input conveyor 55 may be any of a variety of conveying devices designed to convey items. In particular, the input conveyor may be designed to receive items dropped onto the conveyor. For instance, the input conveyor 55 may be a horizontal conveyor belt or a horizontal roller bed formed of a plurality of generally horizontal rollers that are driven, thereby advancing items along the conveyor away from the roller.

The input conveyor 55 may be configured so that an operator can select an item from a supply of items located adjacent the input conveyor. For example, a separate supply conveyor may convey a steady stream of items to the induction station 50. The operator may continuously select an item from the supply conveyor and drop the items onto the input conveyor 55. Alternatively, a large container of items may be placed adjacent the input conveyor 55, such as a bin or other container. The operator may select items one at the time from the supply bin and place each item onto the input conveyor. Still further, the input conveyor 55 may cooperate with a supply assembly that serially feeds items onto the input conveyor. For example, a supply conveyor may convey a continuous stream of items toward the input conveyor 55. The input conveyor may include a sensor for sensing when an item is conveyed away from the input conveyor. In response, the system may control the operation of both the supply conveyor and the input conveyor 55 to drive an item forwardly from the supply conveyor onto the input conveyor. In this way, items may be fed onto the input conveyor either manually by the operator or automatically by a separate feed mechanism operable to feed items to the input conveyor.

Before being loaded onto a vehicle for delivery or sorting, the induction station may include a scanning station 80 for detecting one or more characteristic of each item.

Various factors may be detected to evaluate how an item is to be processed. For instance, an item typically needs to be identified so that the system can determine the location or bin to which the item is to be delivered. This is normally done by determining the unique product code for the item. Therefore, the system may electronically tag an item as being qualified for sorting if the system is able to identify the item using a product marking or other indicator. For example, the operator may read a product identification code on an item and enter the product code into the system using an input mechanism, such as a keyboard. If the product code entered by the operator corresponds to a proper product code, then the item may be qualified for sorting. Alternatively, if the operator enters the product code incorrectly or if the product code does not correspond to a recognized item, the system may electronically tag the item as unqualified.

Similarly, the system may include a scanning element for scanning a product identification marking on the product. By way of example, the items may be marked with one or more of a variety of markings, including, but not limited to, machine-readable optical labels, such as bar codes (e.g. QR or UPC codes), printed alphanumeric characters or a unique graphic identifier. The scanning station 80 may include a scanner or reader for reading such a marking. For instance, a bar code reader, optical reader or RFID reader may be provided to scan the item to read the identification marking.

The reader may be a hand held device manually manipulatable by the operator, such as a handheld laser scanner, CCD reader, bar code wand or camera-based detector that scans an image of the item and analyzes the image data to attempt to identify the product identification marking. In this way, the operator can manipulate the item and/or the detection device to scan the identification marking on the item. Alternatively, the scanner or reader may be a built-in scanner, such as any of the above-mentioned devices that are built into the induction station so that the item is simply conveyed over, across or past the built-in reader, which reads the product identification marking. With such a device, the operator may pass the item over the scanner or the item may be conveyed past the scanner automatically.

Once the product identification marking is determined (either manually or automatically), the system retrieves information regarding the product and then controls the further processing of the item based on the information stored in the central database.

From the foregoing, it can be seen that a variety of different input mechanisms may be utilized to attempt to determine a product identification marking on an item. In the present instance, the scanning system 80 includes one or more optical readers operable to scan items to obtain optical image data of the item. The system then processes the optical image data to detect the presence of a product identification marking. If a product identification marking is detected, the system analyzes the marking to determine the product identification number or code.

Figure 4:
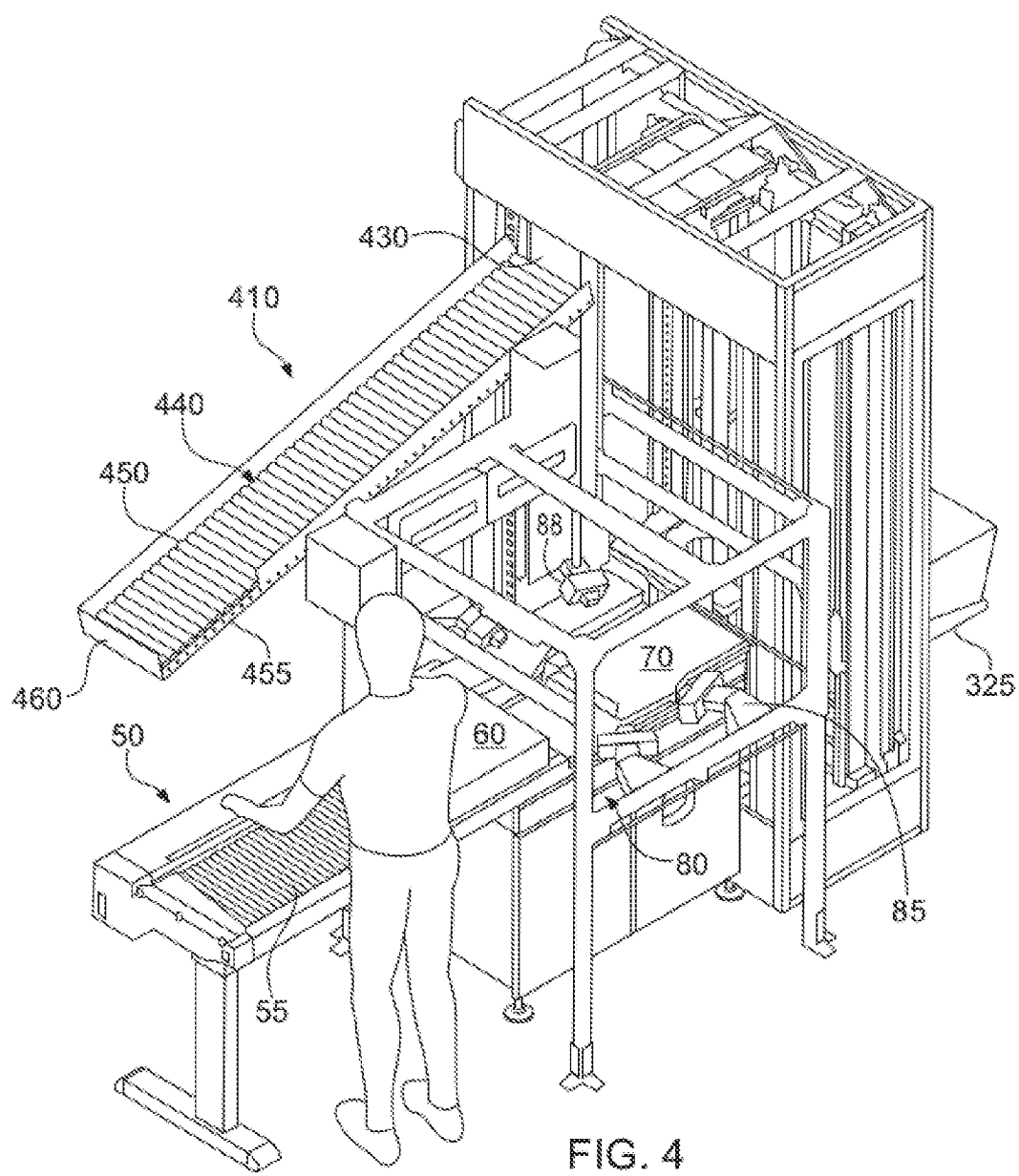
FIG. 4 is a perspective view of an alternate induction station for the material handling system illustrated in FIG. 1 with a re-circulation system.

For example, as shown in the embodiments in FIGS. 1-2 and 4, the scanning station 80 may include a plurality of optical imaging elements 85, 88, such as digital cameras, positioned along the feed conveyor 70. The imaging elements are spaced apart from one another and disposed around the feed conveyor so that the imaging elements can scan various sides of the item as the item is conveyed toward the loading station 310. Specifically, the scanning station 80 includes one or more cameras 85 directed along a horizontal axis to scan the front and back sides of the item. In particular, the scanning station may include a plurality of imaging elements 85 positioned along a front edge of the feed conveyor and a plurality of imaging elements positioned along a rearward edge of the feed conveyor. Additionally, the scanning station 80 may include one or more cameras 88 directed along a vertical axis to scan the top of the item as the item is conveyed along the feed conveyor 70. Further still, additional imaging elements may be provided to scan the leading and trailing faces of an item as the feed conveyor 70 conveys the item. Additionally, the feed conveyor 70 may include a transparent surface that the items are conveyed over so that the bottom surface of the items can be scanned by the detection station. In this way, the scanning station may include an array of sensors, reading elements, scanning elements or detectors positioned around a path of movement so that the scanning station can automatically scan an item for an identification mark while the item is conveyed along the path.

As described above, the scanning station 80 may analyze each item to attempt to find a product identification marking to identify the item based on the marking. If the product identifier is determined the system may then determine the destination for the item and the item may be electronically tagged as qualified for sorting. Similarly, parameters for how the item should be handled by the vehicle may also be determined based information for the product code stored in a database. Conversely, if the product identifier is not determined for an item, then the item may be electronically tagged as not qualified for sorting.

In addition to analyzing the items to find a product marking, the scanning station 80 may incorporate one or more elements operable to evaluate, analyze or measure a physical characteristic of the item to determine how the item is to be processed. For instance, the scanning station 80 may include a scale for weighing items. If the detected weight is greater than a threshold, then the system may electronically tag the item as requiring certain handling during subsequent processing. For instance, if the weight exceeds a threshold, the system may control the subsequent processing to ensure that the item is not discharged into a destination bin into which a fragile item has been placed. Alternatively, if the weight exceeds a threshold (that may be different from the threshold noted above) the item may be tagged as not being qualified for sorting. Similarly, the sorting station 80 may include one or more detectors for measuring a linear measurement for each item. For instance, the sorting station may measure the length, width and/or height of each item. If one of the measurements exceeds a predetermined threshold, then the system may electronically tag the item as requiring special handling during subsequent processing. The system may use any of a variety of elements to measure one or more linear dimension(s) of an item in the scanning station. For instance, the system may use beam sensors (such as an I/R emitter and an opposing I/R detector) to detect the leading and trailing edges of the item. Based on the known speed of the feed conveyor 70, the length of the item can be determined. Similarly, beam sensors can be oriented in a generally horizontal orientation spaced above the feed conveyor a pre-determined height. In this way, if the item breaks the beam sensors then the height of the items exceeds a predetermined threshold so that the system electronically tags the item as not being qualified for sorting.

Further still, the operator may use an input mechanism to identify an item as being unqualified for sorting due to a physical characteristic exceeding a pre-determined threshold. For instance, a scale may be marked on the input conveyor 55 and if the operator sees that an item is too long or too wide or too high, the operator may push a button indicating that the item has a physical characteristic that exceeds an acceptable threshold so that the item is electronically tagged as not being qualified for sorting. Similarly, a measuring gauge can be used to assess a physical characteristic of the item. One type of measuring gauge is a tunnel or chute 60 having spaced apart sides. If the item does not fit between the walls of the chute the item exceeds the allowable height, length or width and is electronically tagged as not being qualified for sorting.

As described above, the scanning station 80 may be configured to analyze each item to detect various characteristics of the items as the items are passed through the induction station. The system may make a qualification decision based on one or more of the characteristics detected or determined by the system. If the item is not qualified for sorting, then the item may be directed to the reject area 325 to await further processing.

Typically, items that are directed to the reject area 325 are subsequently processed manually. An operator takes each piece, identifies the piece and transports the item to the appropriate destination. Since the manual processing of rejected items is time-consuming and labor intensive, it is desirable to reduce the number of items directed to the reject area. Many of the items directed to the reject area 325 may simply have been mis-scanned. Although the items cannot be sorted without sufficient identification information, it may be possible to read the necessary information during a subsequent scan.

Since it may be desirable to re-process some non-qualified items, the information detected during the qualification can be used to identify different categories of non-qualified items. A first type of non-qualified item is a reject item that is directed to the reject area. In the following discussion, these items will be referred to as rejected items. A second type of non-qualified item is one that is not qualified for sorting but is qualified to be re-processed. In the following discussion, these items will be referred to as reprocess items.

The decision on whether an item is tagged as reject, reprocess or sort can be made based on a variety of characteristics. In the present instance, the decision to tag an item as a reject is based on a physical characteristic of the item. Specifically, if an item fails to qualify due to a physical characteristic (e.g. has a linear dimension such as height, width or length that exceeds a threshold), the system electronically tags the item as rejected and the item is directed to the reject area 325 for manual processing. Similarly, if the scanning station includes a scale, an item is tagged as rejected if the weight exceeds a weight threshold. On the other hand, if an item passes qualification based on the physical characteristics, but fails due to an inability to identify a product identification element, then the element is electronically tagged as reprocess so that the item can be reprocessed to attempt to read the product identification information. For instance, depending on the orientation of the product, the imaging elements 85, 88 may have been unable to properly read a bar code or other identifying mark. However, since the scanning station has determined that the item meets the physical parameters for processing the item, the system may transport the item to an alternate output, such as a bin for receiving items to be re-processed. Items sorted or transported to the re-processing bin may be manually returned to the induction station 50 so that the operator can input the items anew. Alternatively, the system may transport such items through the system to a re-induction assembly that returns the item to the entry conveyor 55 of the induction station 50.

In this way, the system 10 is operable to analyze an item to determine one or more of characteristics of the item and determine whether the item is qualified for transportation or if the item needs to be shunted away to ensure that the item is not conveyed through the system by a vehicle. By doing so, the system is able to minimize damage to the items or the system that can occur if oversized or overweight items are transported or attempted to be transported along the track 110 by one of the vehicles 200. Further still, if an item is qualified for transportation, but fails to be qualified for sorting, the item can be transported to a re-induction station to attempt to re-process the item as discussed further below.

As can be seen from the foregoing, the induction station 50 may be configured in a wide range of options. The options are not limited to those configurations described above, and may include additional features.

Additionally, in the foregoing description, the system is described as having a single induction station 50. However, it may be desirable to incorporate a plurality of induction stations positioned along the system 10. By using a plurality of induction stations, the feed rate of pieces may be increased. In addition, the induction stations may be configured to process different types of items.

Referring to FIGS. 1-3, the induction station 50 includes a feed conveyor 70 that serially conveys items to a loading station 310. The loading station is a location along the track 110 that provides an entry point for loading an item onto a vehicle 200. At the loading station 310 the vehicle is aligned with the feed conveyor 70 so that items discharged from the feed conveyor are received onto the delivery vehicle 200 positioned at the loading station. After the item is loaded onto the delivery vehicle, the delivery vehicle moves away from the loading station 310 if the item is electronically tagged as being qualified for transport. Another vehicle then moves into position at the loading station to receive the next item. If the item is not electronically tagged as being qualified for transport, the item is discharged from the vehicle 200 into the reject bin 325.

The reject bin 325 is positioned so that it opposes the feed conveyor 70 of the induction station 50. Additionally, the reject bin 325 is aligned with the vehicle 200 waiting at the loading station 310. In this way, a clear pathway is provided from the induction station 50 to the reject bin 325 without requiring movement of the vehicle along the track 110.

Re-Induction Assembly

Figure 5:
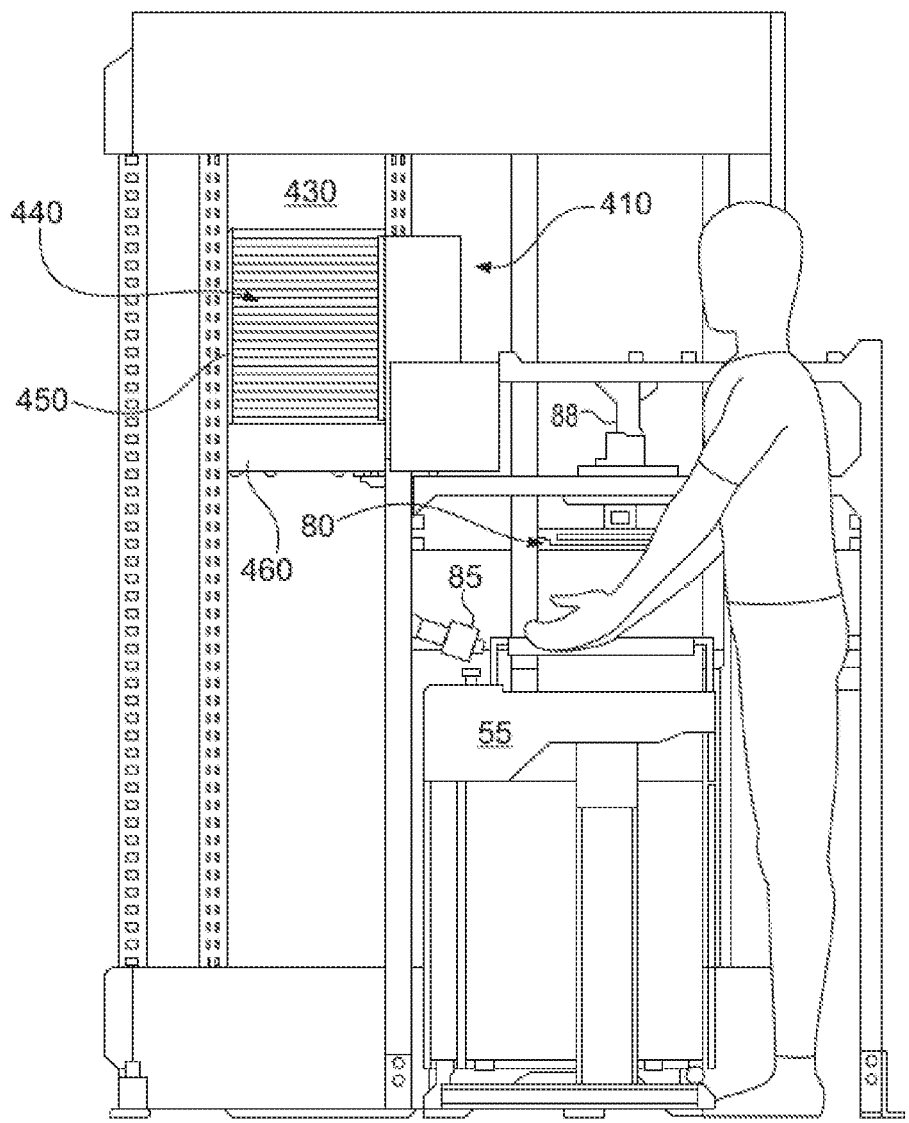
FIG. 5 is a side view of the material handling apparatus incorporating the induction station and re-circulation system illustrated in FIG. 4.
Figure 6:
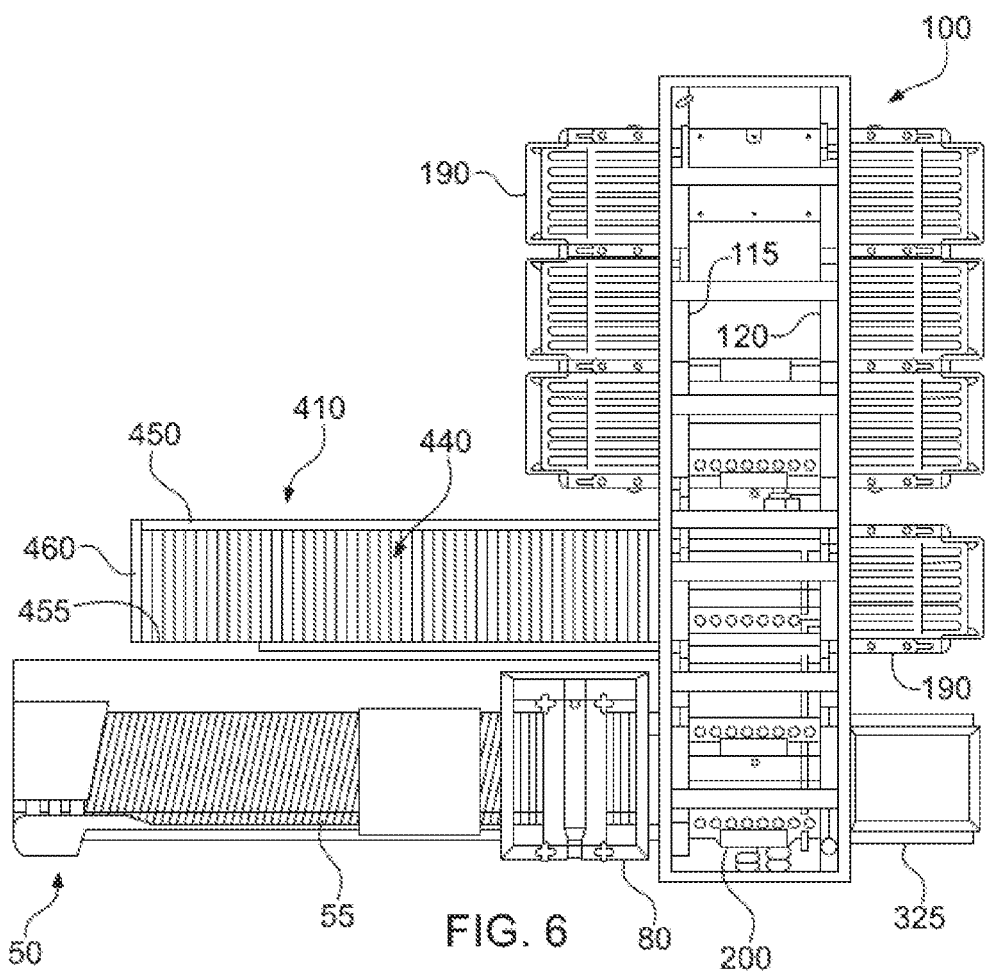
FIG. 6 is a plan view of the material handling system incorporating the induction station and re-circulation system of FIG. 4.

Referring to FIGS. 4-6, an alternate embodiment of the system is illustrated in which the system includes an optional re-induction system for items that were qualified for transport but not qualified for sorting. In FIGS. 4-5, details of the inductions station 50 and re-induction system are illustrated without the details of the sorting station 100, such as the output bins 190 and the track system 110. Items that are qualified for transport may be transported away from the loading station 310 to either a re-induction station or to the sorting station 100. Specifically, a vehicle carrying an item qualified for transport moves upwardly along the track 110 to the upper rail 135. If the item on the vehicle is tagged as re-assess, then the vehicle drives along the track to the re-induction station 430. The vehicle 200 then discharges the item onto the re-induction assembly 410, which conveys the item back toward the induction conveyor so that the item can be re-processed through the induction assembly in an attempt to qualify the item for sorting.

The re-induction assembly 410 comprises a pathway between the track and the induction station 50 to facilitate return of re-assess items to the induction station. The re-induction assembly 410 may comprise any of a number of conveyance mechanisms. The mechanisms can be driven or static, motorized or un-motorized. However, in the present instance, the re-induction assembly 410 comprises a roller bed 440 that is angled downwardly so that items tend to roll along the roller bed. Specifically, the roller bed 440 has an upper end at the re-induction station 430. The re-induction station 430 is positioned vertically higher than the lower end of the roller bed 440 so that gravity tends to force the item along the roller bed when the item is discharged at the upper end of the roller bed at the re-induction station.

The re-induction assembly 440 includes edge guides 450 that project upwardly from the edges of the roller bed and extend along the edges of the roller bed. A transverse wall extends across the lower edge of the roller bed 440 between the edge guides, thereby forming an end wall 460 to retain items from rolling off the end of the roller bed 440. One of the edge guides 450 has a terminal edge spaced apart from the end wall 460 thereby forming an access opening 455 at the end of the roller bed.

The re-induction assembly 410 extends from the track 110 to an area adjacent the induction station 50. Specifically, the end of the re-induction assembly is positioned adjacent the input conveyor 55 and more specifically is positioned so that an operator at the input conveyor can readily access items at the access opening 455 on the roller bed 440.

The induction station 50 may include a secondary scanning element used to scan items being re-processed. For instance, as described above, the scanning station 80 may include an array of imaging elements that scan the item to obtain image data. The image data is then analyzed to detect the presence of a product identification marking. The induction station 50 may also include a portable laser bar code scanner that the operator can use to scan a bar code on the item during re-processing. In this way, a first detection element is used during the first processing and a second detection element is used during the re-processing.

The induction station 50 may also include an input mechanism that the operator can operate to indicate that an item is being re-processed. For instance, the operator may press a button before dropping an item onto the input conveyor 55 from the re-induction assembly 410. The system may then tag the item as being previously processed so that if the system is unable to validate the item for processing on a second attempt the item is tagged as a reject rather than being tagged again as re-assess. In this way, items that have a flaw that prevents identification do not continue to loop through the re-induction assembly 410. Similarly, if a secondary scanning element is used during re-processing, the use of the secondary scanning element can serve as a signal that the item is being re-processed. In other words, the system may tag the item as being re-processed when the secondary element is used to scan an item.

As described above, the re-induction assembly comprises a roller bed 440 that uses gravity to convey items back to the induction station 50. It should be understood that alternative mechanisms could be used rather than a roller bed. For instance, a chute or flat slide may be used. Alternatively, a conveyor belt could be incorporated to drive the items toward the induction station. Additionally, in the above description the re-induction assembly 410 is a generally straight path. However, it should be understood that the re-induction assembly my incorporate a turn or angle so that the discharge end of the re-induction assembly is positioned adjacent the input conveyor 55 of the induction station. Further still, in FIGS. 4-5 and the above description, the re-induction station 430 is located in the column next to the loading column 300. However, it should be understood that the re-induction station 430 and the accompanying conveyor 440 may be located in other columns, including the loading column 300.

Sorting Station

Items that are qualified for sorting by the induction station 50 are conveyed by vehicles to the sorting station. Referring to FIGS. 1-6, the system includes a sorting station 100, such as an array of bins 190 for receiving the pieces.

The track 110 includes a horizontal upper rail 135 and a horizontal lower rail 140. A plurality of vertical legs 130 extend between the upper horizontal leg and the lower horizontal leg 140. During transport, the vehicles travel up a pair of vertical legs from the loading station 310 to the upper rail 135. The vehicle then travels along the upper rail until reaching the column having the appropriate bin or destination. The vehicle then travels downwardly along two front vertical posts and two parallel rear posts until reaching the appropriate bin or destination, and then discharges the item into the bin or destination area. The vehicle then continues down the vertical legs until reaching the lower horizontal leg 140. The vehicle then follows the lower rail back toward the loading station.

Figure 7:
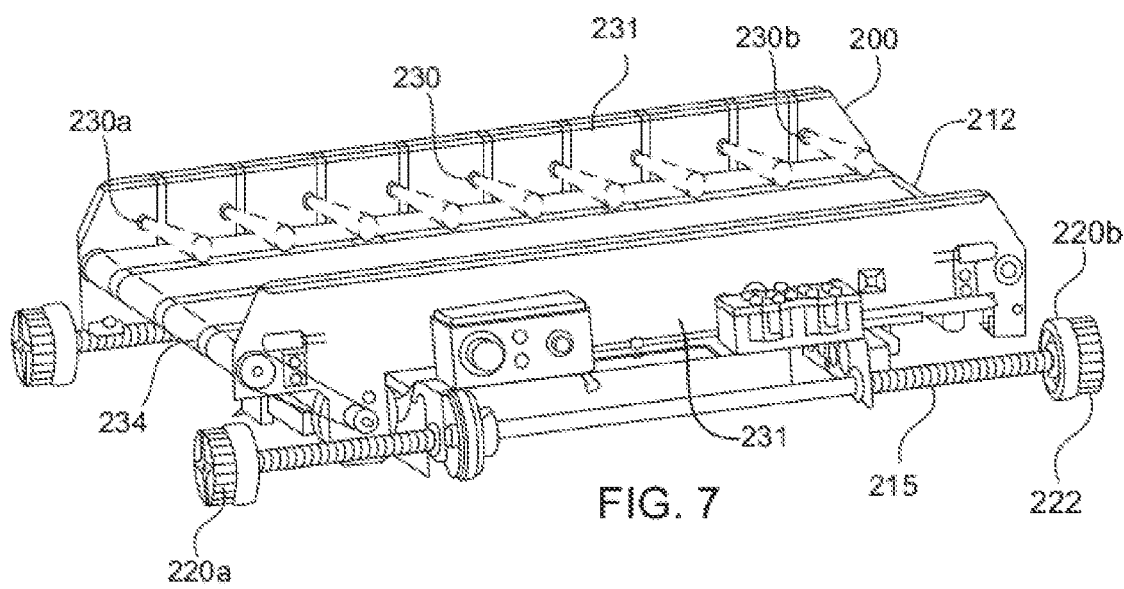
FIG. 7 is a top perspective view of a delivery vehicle of the apparatus illustrated in FIG. 1.

The track 110 includes a front track 115 and a rear track 120. The front and rear tracks 115, 120 are parallel tracks that cooperate to guide the vehicles around the track. As shown in FIG. 7, each of the vehicles includes four wheels 220: two forward wheel 220A and two rearward wheels 220B. The forward wheels 220A ride in the front track, while the rearward wheels 220B ride in the rear track. It should be understood that in the discussion of the track, the front and rear tracks 115, 120 are similarly configured opposing tracks that support the forward and rearward wheels 220A, 220B of the vehicles. Accordingly, a description of a portion of either the front or rear track also applies to the opposing front or rear track.

Referring now to FIGS. 1-3 a loading column 300 is formed adjacent the output end of the induction station 50. The loading column 300 is formed of a front pair of vertical rails 305a, 305b and a corresponding rearward set of vertical rails. The loading station 310 is positioned along the loading column. The loading station 310 is the position along the track in which the vehicle 200 is aligned with the discharge end of the feed conveyor 70 of the induction station 50. In this way, an item from the induction station may be loaded onto the vehicle as it is conveyed toward the vehicle from the input station.

The details of the track are substantially similar to the track as described in U.S. Pat. No. 7,861,844. The entire disclosure of U.S. Pat. No. 7,861,844 is hereby incorporated herein by reference.

As described above and referring to FIG. 3, the track includes a plurality of vertical legs extending between the horizontal upper and lower rails 135, 140. An intersection is formed at each section of the track at which one of the vertical legs intersects one of the horizontal legs. Each intersection includes a pivotable gate that has a smooth curved inner race and a flat outer race that has teeth that correspond to the teeth of the drive surface for the track. The gate pivots between a first position and a second position. In the first position, the gate is closed so that the straight outer race of the gate is aligned with the straight outer branch of the intersection. In the second position, the gate is open so that the curved inner race of the gate is aligned with the curved branch of the intersection.

In the foregoing description, the sorting station 100 is described as a plurality of output bins 190. However, it should be understood that the system may include a variety of types of destinations, not simply output bins. For instance, in certain applications it may be desirable to sort items to a storage area, such as an area on a storage shelf. Alternatively, the destination may be an output device that conveys items to other locations.

The output bins 190 may be generally rectilinear containers having a bottom, two opposing sides connected to the bottom, a front wall connected to the bottom and spanning between the two sides. The bin may also have a rear wall opposing the front wall and connected to the bottom and spanning the two sides. In this way, the bin may be shaped similar to a rectangular drawer that can be pulled out from the sorting station to remove the items from the bin.

The bins in a column are vertically spaced apart from one another to provide a gap between adjacent bins. A larger gap provides more clearance space for the vehicles to discharge items into a lower bin without the bin above it interfering with the item. However, a larger gap also decreases the number of bins or the size of bins (i.e. the bin density). Therefore, there may be a compromise between the size of the gap and the bin density.

The vehicles 200 discharge items into the bins through the rearward end of the bin. Therefore, if the backside of the bin is open the vehicle can readily discharge an item into the bin through the rearward open end of the bin. However, if the bin does not have a rearward end the items may tend to fall out of the bin when the bin is withdrawn from the sort rack. Accordingly, depending on the application, the bin may have an open rearward end or a closed rearward end. If the rearward end is closed, the rear wall may be the same height as the forward wall. Alternatively, the rear wall may be shorter than the forward wall to provide an increased gap through which the items may be discharged into the bin. For instance, the rear wall may only be half the height of the forward wall. Optionally, the rear wall may be between one quarter and three quarter the height of the forward wall. For instance, the rear wall may be between one half and three quarters the height of the forward wall. Alternatively, the rear wall may be between one quarter and three quarter the height of the forward wall.

Alternatively, rather than having a fixed rear wall, the bins 190 may have moveable or collapsible rear walls. For instance, the rear wall of the bin may be displaceable vertically relative to the bottom of the bin. In particular, the rear wall may be displaceable by pressing the wall downwardly. The rear wall may be displaceable within grooves or slots formed in the side walls of the bin so that pressing the rear wall downwardly causes the rear wall to be displaced downwardly so that a portion of the rear wall projects below the bottom of the bin. In such an embodiment, the rear wall may be biased upwardly by a biasing element, such as a spring, so that the rear wall tends to remain in an upward position with the bottom edge of the rear wall above the bottom edge of the bin. The rear wall only moves downwardly in response to a force on the rear wall that exceeds the upward biasing force.

Yet another alternative bin incorporates a collapsible rear wall. Like the displaceable wall, the collapsible wall moves downwardly by pressing downwardly against the collapsible wall. The collapsible wall may be formed in a variety of configurations, such as an accordion or pleated configuration so that the wall folds downwardly when the wall is pressed downward. The collapsible wall may include a biasing element biasing the wall upwardly to an extended position. For instance, the biasing element may include one or more springs or elastomeric elements biasing the wall upwardly to the extended position.

As discussed above, the system is operable to sort a variety of items to a plurality of destinations. One type of destination is a bin; a second type is a shelf or other location on which the item is to be stored; and a third type of destination is an output device that may be used to convey the item to a different location. The system may include one or more of each of these types or other types of destinations.

Delivery Vehicles

Each delivery vehicle 200 is a semi-autonomous vehicle having an onboard drive system, including an onboard power supply. Each vehicle includes a mechanism for loading and unloading items for delivery. An embodiment of a vehicle that may operate with the system 10 is illustrated and described in U.S. Pat. No. 7,861,844, which is incorporated herein by reference. However, an alternate vehicle 200 is illustrated in FIG. 8. The vehicle includes additional sensors for detecting characteristics of the item being delivered.

The vehicle 200 may incorporate any of a variety of mechanisms for loading an item onto the vehicle and discharging the item from the vehicle into one of the bins. Additionally, the loading/unloading mechanism 210 may be specifically tailored for a particular application. However, in the present instance, the loading/unloading mechanism 210 is one or more conveyor belts that extend along the top surface of the vehicle. The conveyor belts are reversible. Driving the belts in a first direction displaces the item toward the rearward end of the vehicle; driving the belt in a second direction displaces the item toward the forward end of the vehicle.

A conveyor motor mounted on the underside of the vehicle drives the conveyor belts 212. Specifically, the conveyor belts 212 are entrained around a forward roller at the forward edge of the vehicle, and a rearward roller at the rearward edge of the vehicle. The conveyor motor is connected with the forward roller to drive the forward roller, thereby operating the conveyor belts.

The vehicle includes four wheels 220 that are used to transport the vehicle along the track 110. The wheels 220 are mounted onto two parallel spaced apart axles 215, so that two or the wheels are disposed along the forward edge of the vehicle and two of the wheels are disposed along the rearward edge of the vehicle.

Each wheel 220 comprises an outer gear that cooperates with the drive surface of the track. The outer gear is fixed relative to the axle onto which it is mounted. In this way, rotating the axle operates to rotate the gear. Accordingly, when the vehicle is moving vertically the gears cooperate with the drive surface of the track to drive the vehicle along the track.

The vehicle includes an onboard motor for driving the wheels 220. More specifically, the drive motor is operatively connected with the axles to rotate the axles 215, which in turn rotates the gears 222 of the wheels.

As the vehicle travels along the track, an item on top of the vehicle may tend to fall off the vehicle, especially as the vehicle accelerates and decelerates. Therefore, the vehicle may include a retainer to retain the element on the vehicle during delivery. The retainer may be a hold down that clamps the item against the top surface of the vehicle. For instance, the retainer may include an elongated pivotable arm. A biasing element, such as a spring, may bias the arm downwardly against the top surface of the retainer.

Alternatively, rather than using a retainer, the system may retain the item on the vehicle 200 by controlling the operation of the vehicle. For instance, the vehicle 200 may include a plurality of sensors 230 spaced apart from one another across the width of the vehicle. In the embodiment illustrated in FIG. 7, the sensors 230 are spaced apart along a wall 231 at the leading edge of the vehicle. The wall may be an elongated element that extends the width of the vehicle. The wall operates as a stop or constraint, limiting items from falling off or being discharges from the leading edge of the vehicle. Similarly, the vehicle 200 may include a trailing wall 232 that may extend the width of the vehicle. The trailing wall 232 may operate as a stop or constraint, limiting items from falling off or being discharged from the trailing edge of the vehicle. The vehicle may also include a plurality of sensor elements spaced apart from one another along the trailing wall 232 similar to the sensors 230 shown on the leading wall 231 in FIG. 7. The sensors 230 may be any of a variety of sensors, including, but not limited to photoelectric sensors (such as opposed through beam sensors or retroreflective sensors) or proximity sensor (such as capacitive, photoelectric or inductive proximity sensors.). The sensors can be used to detect the location of the item across the width of the vehicle. Specifically, the sensors can detect how close the item is to the front side 234 or the rear side 236 of the vehicle. Similarly, if the sensors 230 are proximity sensors, the sensors can detect how close the item is to the leading edge (i.e. leading wall 231) of the vehicle and/or the trailing edge of the vehicle (i.e. trailing wall 232). Further still, the sensors can detect movement of the item on the vehicle so that the system can detect the direction that the item is moving if the item is moving on the vehicle.

Based on signals from the sensors 230 regarding the position or movement of the item on the vehicle 200, the system can control the vehicle to re-position the item to attempt to maintain the item within a desired location on the vehicle. For instance, it may be desirable to maintain the item generally centered on the top of the vehicle. The system can control the position of the item on the vehicle using any of a variety of controls. For instance, as noted previously, the vehicles 230 may include one or more conveyor belts for loading and discharging items. In such a configuration, the item rests on the belts, so the belts are operable to drive the items toward the forward edge 234 or the rearward edge 236 depending on signals received from the sensors. In one example, if the signals from the sensors indicate that the item is shifted closer to the rearward edge than the forward edge, the controller can send a signal to the motor driving the belt so that the belt drives in a first direction to drive the item toward the forward edge 234. Similarly, if the signals from the sensors indicate that the item is shifted closer to the forward edge than the rearward edge, the controller can send a signal to the motor driving the belt so that the belt drives in a second direction to drive the item in the opposite direction to drive the item toward the rearward edge 236. The sensors provide continuous feedback so that the position of the item can be continuously monitored and adjusted toward the forward edge or toward the rearward edge as the item shifts. In this way, the system provides a feedback loop for providing real-time adjustment of the position of the item to retain the item within a desired area on the top of the vehicle.

Additionally, the system can monitor the location of the item relative to the leading and trailing edges of the vehicle (such as walls 231, 231). In response to the detected location of the element, the system can control the operation of the vehicle if the item is too close to the leading edge or too close to the trailing edge. Specifically, the system may control the acceleration and braking of the vehicle to attempt to shift the item toward the leading or trailing edge depending on the detected position. If the sensors 230 detect that the item is positioned closer to the leading edge than the trailing edge, the vehicle may be accelerated (or the acceleration may be increased), thereby urging the item toward the trailing edge. Alternatively, the vehicle may be decelerated to urge the item toward the leading edge.

In addition to verifying or monitoring the position of an item on the vehicle, the sensors can be used to detect one or more characteristic of the item. For instance, the sensors can be used to detect the length of width of the item. The sensors may also be used to detect the general shape of the item. This information can be used during further processing of the item as discussed further below.

As discussed above, the bins 190 may include a rearward wall that is displaceable or collapsible. Accordingly, the vehicles may include a mechanism for applying a downward force on the rearward wall sufficient to overcome a biasing force retaining the wall in an upper or upright position. For instance, the vehicle may include an extendable element such as a pin or rod. When the vehicle approaches the target delivery bin the pin may be extended transversely, away from the vehicle so that the pin extends over the rearward wall of the target bin. As the vehicle nears the bin the extended pin engages the upper edge of the rear wall of the bin. Driving the vehicle downwardly drives the pin downwardly against the rearward wall. The system may control the vertical position of the vehicle to control how far the vehicle pushes down or collapses the rear wall. After the vehicle discharges the item into the bin, the extendable element may be retracted, thereby releasing the rear wall so that the biasing element displaces the rear wall upwardly into the upper position.

The vehicle 200 may be powered by an external power supply, such as a contact along the rail that provides the electric power needed to drive the vehicle. However, in the present instance, the vehicle includes an onboard power source that provides the requisite power for both the drive motor and the conveyor motor. Additionally, in the present instance, the power supply is rechargeable. Although the power supply may include a power source, such as a rechargeable battery, in the present instance, the power supply is made up of one or more ultracapacitors.

As discussed further below, the vehicle further includes a processor for controlling the operation of the vehicle in response to signals received from the central processor. Additionally, the vehicle includes a wireless transceiver so that the vehicle can continuously communicate with the central processor as it travels along the track. Alternatively, in some applications, it may be desirable to incorporate a plurality of sensors or indicators positioned along the track. The vehicle may include a reader for sensing the sensor signals and/or the indicators, as well as a central processor for controlling the operation of the vehicle in response to the sensors or indicators.

Edge-Sensing System

As described above, the system 10 may include one or more elements for detecting an item on the vehicle. It also may be desirable to detect the leading and trailing edges of an item when the item is loaded onto a vehicle or discharged from the vehicle. Accordingly, each vehicle may include one or more sensors to detect items on the vehicle.

In the embodiment illustrated in FIG. 7, each vehicle may include a plurality of detectors 230 that detect items on the top of the vehicle (i.e. on the surface of the belt 212). One of the sensors 230A may be positioned near the front edge 234 to detect the items as the items are loaded onto or discharged from the front edge. Similarly, one of the sensors 230B may be positioned adjacent the rear edge 236 to detect items as the items are loaded onto or discharged from the rear edge. For instance, the leading sensor 230A may be a beam break sensor so that when an item passes in front of the beam the beam is interrupted. When an item is loaded onto the vehicle 200, the leading edge of the item will interrupt the beam, thereby indicating that the ledging edge of the item is on the vehicle. The item may continue to block the lead sensor 230A until the trailing edge of the item passes the lead sensor 230A. After the trailing edge of the item passes the lead sensor 230A, the lead sensor will no longer detect the item, thereby indicating that the item is loaded onto the vehicle. After the trailing edge passes the lead sensor 230A, the conveyor 212 may continue to drive the item toward the rear edge 236 to ensure that the item is centered along the width of the vehicle. Similarly, the lead sensor 230A may detect the leading and trailing edges of the item as the item is discharged from the front 231 of the vehicle. Detection of the trailing edge passing the front sensor 230A can be used to signal that the item has been discharged from the vehicle. The vehicle is then prompted to advance away from the discharge location. The description above of the use of the lead sensor 230A to detect the leading and trailing edges of items being loaded onto or discharged from the front edge applies similar to the use of the rear sensor 230B in detecting the leading and trailing edges of an item as the item is loaded onto or discharged from the rear edge of the vehicle.

In the foregoing description, the sensors 230 detect items being loaded onto and being discharged from the front edge 234 or rear edge 236 of the vehicle. In certain applications it may be desirable to incorporate a sensing assembly that provides for detection for a greater variety of items. For instance, when using a beam break sensor it may be difficult to detect the leading or trailing edge of the item if the item is very thin or if the item is transparent or translucent. Accordingly, the system may incorporate an alternate sensing arrangement designated 500 and illustrated in FIGS. 8-12. Although the sensing arrangement is described in connection with a vehicle of the material handling system 10, it should be understood that the sensing arrangement 500 may incorporated into other aspects of the system, such as detecting a item as it passes along through the induction station. Further still, the sensing arrangement 500 described below may find further application in fields of endeavor outside the material handling field, including, but not limited to fields such as mail processing or document processing.

Embodiments of the edge sensing assembly include a system and method for aiding in the reliable and accurate detection of an event such as the traversal of a detection plane by the leading and/or trailing edge surface(s) of an object supported by an underlying conveyor surface. According to one or more embodiments, the detection plane is defined by optical energy, emitted by a laser and collimated by a lens system to form a diverging, constant width beam propagating within the detection plane. A linear array of photodetectors is maintained in alignment with the lens system such that the collimated optical energy will strike, at a non-normal angle of incidence, any object which crosses the detection plane.

Conventional "cross-beam" sensors may have a difficult time detecting clear objects, thin objects and/or irregular shaped objects. In accordance with one more embodiments consistent with the present disclosure, however, such objects are readily sensed by a change in the intensity of the optical energy detected by one or more of the photodetectors in the array. For example, if an optically opaque object is present, optical energy will be absorbed such that at least one of the photodetectors senses a drop in optical intensity. Alternatively, for an object that includes portions and/or packaging which is optically transparent, some light may pass and some may be reflected or refracted such that at least one of the photosensors senses a less pronounced, but nonetheless detectable, drop in optical intensity. Even relatively thin (on the order of 0.05 mm) objects may be reliably detected with an appropriate arrangement of the lens system and photodetectors.

Various embodiments of systems and methods for detecting traversal of a detection plane by the leading and/or trailing edge surface(s) of an object supported by an underlying conveyor surface are described. In the following detailed description, numerous specific details are set forth to provide a thorough understanding of the claimed subject matter. However, it will be understood by those skilled in the art that claimed subject matter may be practiced without these specific details. In other instances, methods, apparatuses or systems that would be known by one of ordinary skill have not been described in detail so as not to obscure claimed subject matter.

The edge detecting assembly 500 includes one or more emitters 504 for emitting a source of light and one or more detectors 506 for detecting the emitted light. At least one emitter 504 is positioned below the surface S on which the item is supported. For example, in the embodiment illustrated in FIG. 10, the emitter 504 is vertically spaced from the place of surface S so that the emitter is below the plane of surface S. In this example, the plane of surface S is a horizontal plane and the emitter is under the surface. In this way, light emitter from emitter 504 projects upwardly at an angle relative to the plane of surface S. By projecting the emitted light at an angle relative to surface S, the object may have a larger surface to impinge the emitted light than if the light is emitted parallel to the surface S. For instance, in the example of a piece of paper laying on surface S, if the light from the emitter is projected parallel to surface S, then only the side edge of the paper will reflect or block emitted from the emitter. Since the side edge of the paper is so thin (such as 0.05 mm) it would be difficult or impossible to detect using an emitter that projects light parallel to surface S. However, by lower the emitter to a position below S and projecting the light at an angle relative to surface S, then entire width of the paper may reflect light from the emitter.

Turning now to FIG. 8, the object sensing assembly 500 is adapted to sense when a boundary surface of an object (e.g., the leading edge or trailing edge of object disposed on an underlying object support surface) has crossed into a detection plane or "curtain" 502 of light emitted by an emitter 504, also referred to as an emitter. A linear array of photodetector elements 506, indicated generally at 508, is aligned with the emitter 504 so that the emitted light strikes each of the photodetectors with undiminished intensity unless an object is interposed into the detection plane 502.

In some embodiments, the emitter 504 is a solid state laser that emits a beam of coherent light within the range of wavelengths visible to the human eye. For efficient and reliable detection of its output, the emitter 504 may be a laser which emits light at or near the peak sensitivity of the photodetectors 506. According to one embodiment, the photodetectors are phototransistors which, by way of example, may have a spectral range of sensitivity within a range of frequencies between 350 to 950 nm and a sensitivity peak of 560 nm. One such phototransistor is the SFH3710 manufactured by Osram Opto Semiconductors GmbH of Regensburg, Germany. It should be noted, however, that other photodetectors such, for example, as photodiodes, may be employed in place of phototransistors. The effects of ambient light on photodetector sensitivity may be addressed, if appropriate, by placing a bandpass filter over the array 508 to prevent light outside a narrow range centered around the sensitivity peak from reaching the photodetectors.

The emitter 504 may comprise a single laser having an integral lens system including one or more collimating lenses as lens 522. The lens 522 is dimensioned and arranged to receive optical energy emitted by the laser source and to collimate the received optical energy such that the light beam diverges within the curtain 102 along a major axis but does not diverge along a minor axis. As seen in FIGS. 8 and 9A taken together, the collimated output of the emitter 504 propagates within curtain 102 and forms a line or area 550 spanning each photodetector 506 of the linear array 508. Even thin and optically transmissive (e.g. translucent) or highly reflective objects can be detected if the collimated output of the optical source 504 strikes the object at an oblique angle and the photodetectors are spaced from one another and located at an elevation relative to where light enters and/or is reflected by the object.

For example, from the perspective of FIG. 8, using a light curtain 502 having a width of approximately 25-35 cm wide and a height of approximately 10 to 20 cm the assembly can detect an object having a thickness of between 0.05 mm (i.e. the thickness of a single sheet of paper) to about 10 cm and a width on the order of about 7.5 cm to about 30.5 cm. Such detection can be achieved with a 1 mW laser having integrated collimating optics. With a fan angle of 20 degrees and a beam divergence of less than 2 milliradians (m Rads), such a laser can project a 5 cm line having a width of 1-2 mm. When placed adjacent to, but slightly below, a discharge end of an object support surface, the optical source 504 and array 508 form a detection plane which is transverse and orthogonal to the plane defined by the object support surface. In some embodiments, the object support surface may be the moving surface of a conveyor belt. In other embodiments, the object support surface may be a stationary or tilting table surface.

Depending on the components forming the collimating lens system, the intensity of light within line 550 in FIG. 9A may be uniform across all photodetectors 506 when no object is present to interfere with the integrity of the light curtain 502. Alternatively, the intensity across light curtain 502 may vary according to a Gaussian or other predictable distribution function. In either case, embodiments consistent with the present disclosure are configured to detect a change in optical intensity received at any of photodetectors 506 when an object crosses (or leaves) the light curtain 102. That is, when an amount of optical energy above a sensitivity threshold is absorbed, reflected or refracted by an object on surface S, the output of at least one of the photodetectors 506 of array 508 will signal a change in state.

In an illustrative example where the sensing arrangement 500 forms part of a material handling system, a detected change of photodetector state may be used to confirm the successful transfer of an object into a storage or packing location, successful retrieval of an object from a storage location or picking location. Conversely, the failure to detect a signal indicative of a change in state may also be used to control an operation in a material handling or other system. For example, after a predetermined "timeout" interval, failure to register a change of state may be used as part of an alert sequence (e.g., to trigger an audible or visual alert to a human operator).

One possibility for increasing the coverage of the light detected by the detectors 506 would be to use a complementary pair of photodetector arrays and optical sources so as to increase the coverage of the light curtain. In the arrangement of FIG. 8, however, it will be seen that a reflecting mirror 516 may be used to fold the optical path and thereby obtain comparable results. In such arrangements, the photodetector elements 506 of array 508, together with the emitter 504, may be optionally mounted to a first rigid support 510 to form an integrated emitter/detector assembly 512. A reflecting mirror 516 may be mounted to a second rigid support 518. The first and second supports 510, 518 may be rigidly connected, such as by a support shaft 520 extending between the two supports. The shaft 520 may be resiliently biased to maintain the orientation of the light curtain 502 relative to the surface S, while also permitting transient angular reorientation of the light curtain in response to translation of surface S.

In some embodiments, the photodetector elements 506 and optical source 504 may be mounted on a common substrate 524 such, for example, as a printed circuit board. The collimated, diverging beam emitted by lens 522 of emitter 504 is reflected by the surface 530 (FIG. 9B) of mirror 516 and forms a projected line or area 550 over the array 508 of photodetectors 506. In an exemplary application, where objects to be processed are expected to have heights which may vary from less than one mm up to 20 cm or more, line 550 may have a width W, for example, on the order of from about one to about five mm wide and a length L, for example, on the order of 10 to 20 cm long. In an exemplary embodiment, the array 508 is arranged to provide coverage over the entire length of the line L.

To accommodate the detection of very thin objects, those photodetectors 506 of the array closer to the object support surface S may be more closely spaced than those further away from the object support surface. In the exemplary embodiment of FIG. 9A, the spacing $d_1$ among the lowest four photodetectors may be on the order of 1-5 mm while the spacing $d_2$ among the remaining photodetectors is on the order of 10-15 mm. Of course, such an arrangement is described herein by way of illustrative example only. Also contemplated herein are arrangements such as those in which the inter-photodetector spacing among at least a subset of the photodetectors increases monotonically with distance from the object supporting surface, and/or arrangements in which a uniform inter-photodetector spacing is used. It suffices to say that the number and spacing of the photodetectors may be varied without departing from the spirit and scope of the present disclosure.

FIG. 9B depicts a reflecting mirror mounted on an arm 518 and alignable with the support 510 of FIG. 9A to form an object sensing arrangement 512 such as the one depicted in FIG. 8. As seen in FIG. 9B, the mirror 516 defines a substantially planar reflecting surface 530 and is affixed to second rigid member 518. Additionally, as shown in FIGS. 8, 9A and 9B, the height of the curtain of light impinging mirror 516 is substantially less than the height (L) of the array 508. Accordingly, the height of the mirror 516 may be substantially less than the height (L) of the array 508.

A transverse bore 526a and 526b may be defined in each of first rigid member 510 and second rigid member 518 to accommodate insertion of an optional mounting shaft such as mounting shaft 520 (FIG. 8). In operating environments in which the sensing arrangement is secured to a stationary structure such, for example as the frame of a conventional belt or roller conveyor, the mounting shaft and corresponding transverse bores 526a and 526b may be omitted. Alternatively, or in addition, some other structure for aligning the optical source, photodetectors and reflecting mirror (if applicable) relative to one another and to an object support surface may be employed.

Figure 10A:
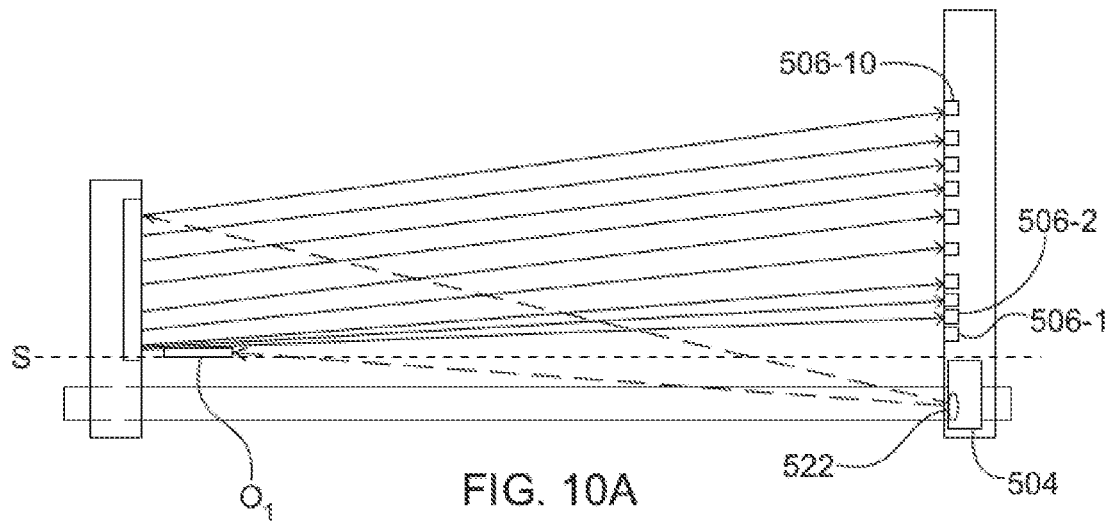
FIG. 10A is a front view of an object sensing arrangement detecting an optically opaque object when the object traverses a detection plane defined by propagation of collimated optical energy in a direction transverse to an object conveying path.

FIG. 10A depicts use of a sensing arrangement such as the one depicted in FIG. 8 to detect an optically opaque object $O_1$ as the object moves along an object conveying path (e.g., upon an underlying support surface S) and traverses a light curtain (or "detection plane") that is defined by propagation of collimated optical energy in a direction transverse to the object conveying path. As seen in FIG. 10A, light emitted by optical energy source 504 is collimated by a lens structure which includes lens 522. In this example, the height and width of object $O_1$ are such that light from emitter 504 is reflected from mirror 516 and detected by detectors 506-2 through 506-10. However, object $O_1$ absorbs most or all of the optical energy that would have reached photodetector 506-1, so that detector 506-1 does not detect light or the light detected by detector 506-1 is below a threshold.

As explained in greater detail below, the reduction in intensity at the photodetector 506-1 can be processed by appropriate sensing logic as a change in state (e.g., a logical "1") indicative of an object traversing the detection plane defined by a surface of a generated light curtain 502. Likewise, when no part of the object $O_1$ remains within the light curtain, a second state transition occurs when the intensity of the optical energy received at photodetector 506-1 returns to the earlier state (e.g., a logical "0").

Figure 10B:
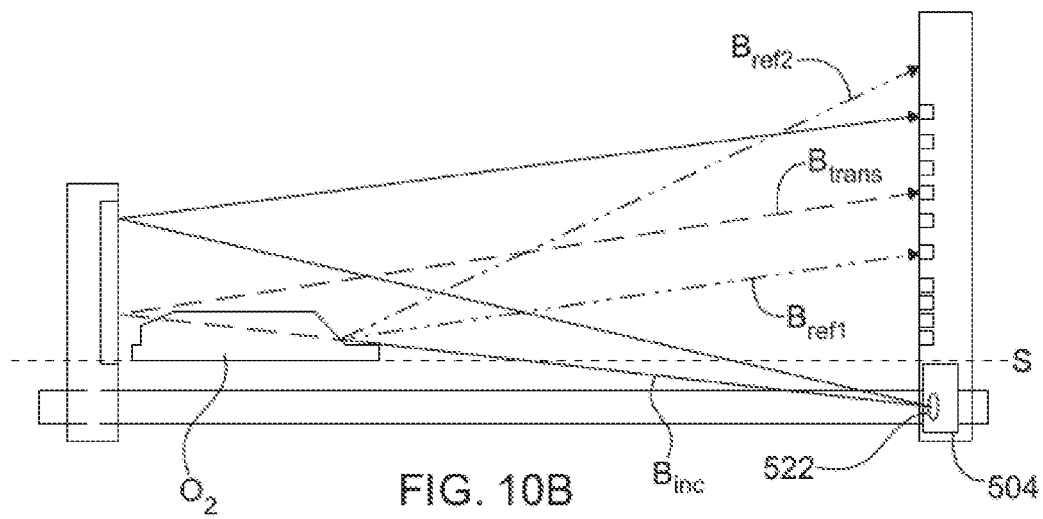
FIG. 10B is a front view of an object sensing arrangement detecting an object having at least one light refracting or reflecting portion while such object traverses a detection plane defined by propagation of collimated optical energy in a direction transverse to an object conveying path.

FIG. 10B depicts the detection of an object $O_2$ that includes at least one light refracting or reflecting portion when object $O_2$ moves along a conveying path that is traverse a detection plane defined by propagation of collimated optical energy. For example, object $O_2$ may be an item such as block contained in a transparent or translucent packaging that extends beyond the volume of the block. Such an object may have portions that are opaque (e.g. the block) and portions that are transparent or reflective (e.g., the packaging that encapsulates the block).

Some of the light emitted by the emitter 506 will pass through clear portions of object $O_2$. and in configurations in which the emitter is parallel to the surface S, the light may pass through the clear or translucent portion so that the system does not detect the object. In the present instance, since the light emitted by emitter 506 is transverse the support surface S on which object $O_2$ is supported, the light passing through transparent or translucent portions of object $O_2$ may be refracted such that the light does not impinge the detector array 508. For example, referring to FIG. 10B, emitted light such as that propagating along the ray $B_{inc}$ will strike surfaces of $O_2$ at an oblique (non-normal) angle. Some of the incident light $B_{inc}$ may be reflected and/or refracted after striking the object $O_2$. Depending upon the surface characteristics of object $O_2$, some or all of the reflected incident light may be directed away from the photodetectors, as ray $B_{ref2}$, and other portions (e.g. ray $B_{ref1}$) may be reflected into a different photodetector than it would have if all of the light had been transmitted through the object $O_2$ (e.g., along ray $B_{trans}$) or if the object not been there at all. In this way, the array will detect a change in light from the emitter when the translucent or transparent portions of the object refract light away from the array so that the system will detect the object.

As noted previously, the edge detection assembly 500 may be incorporated into a vehicle used in the material handling system 10 described above. For instance, turning to FIG. 11 an alternate vehicle 600 is illustrated. The vehicle 600 is substantially similar to the vehicles 200 described above, however, the vehicle 600 includes one or more edge detection assemblies 602, 604 similar to the edge detection assembly 500 described above.

Each vehicle 600 may include a single object sensing arrangement for sensing object movement in a single direction along a conveying path. Alternatively, and as shown, each vehicle 600 may include a pair of object sensing arrangements in the form of detection assemblies 602 and 604. Each vehicle may also include one or more conveyors for conveying objects while the objects are on the vehicle. The belt forms a generally flat or planar surface for supporting objects on the vehicle 600. For instance, the conveyor 606 may be a conveyor belt. The first detection assembly 602 may be positioned adjacent a rear edge of the vehicle 602 so that the emitter is positioned below the top surface of the conveyor belt 606. The detectors of the detection assembly 602 may be positioned above the surface of the conveyor belt. Additionally, the detection assembly may be positioned adjacent the rear edge of the conveyor belt so that the surface of the conveyor belt does not extend between the emitter and detector of the detection assembly. In this way, as an object passes onto the rear edge of the vehicle the object will first pass between the emitter and detector array of the detection assembly 602. Similarly, when an object is being discharged from the rear edge of the vehicle, the leading edge of the item will pass between the emitter and detector array of the detection assembly if the leading edge extends past the end of the conveyor. Similarly, the front detection assembly 604 is positioned adjacent the front edge of the vehicle so that front detection assembly 604 detects the leading edge of objects as the object is being loaded onto or discharged from the leading edge of the vehicle.

Detection assembly 602 may, for example, signal a first change in logic state when an object is moved by conveyor 606 in a first transfer direction "A" such that the leading edge of the object crosses a first light curtain detection plane of the edge sensing assembly, as previously described in connection with assembly 500. Such a signal would be indicative of the leading edge of the item being discharged from the rear edge of the vehicle. Likewise, detection assembly 602 may signal a subsequent (e.g., second) change in logic state if and when continued movement of the object by conveyor 606 in the direction A results in the trailing edge of the object exiting the first light curtain detection plane. Such a signal would be indicative of the trailing edge of the object being discharged from the rear edge of the vehicle, thereby indicating that the item has been discharged from the vehicle.

Similarly, detection assembly 604 may signal a first change in logic state when an object is moved by conveyor 606 in a second transfer direction "B" and its leading edge crosses a second light curtain detection plane of the edge sensing assembly 604. Likewise, detection assembly 604 may signal a subsequent (e.g., second) change in logic state if and when continued movement of the object by conveyor 606 in the direction B results in the trailing edge of the object exiting the second light curtain detection plane.

The vehicle 600 may include side walls dimensioned and arranged to prevent translation of an object on conveyor surface 605 as the vehicle moves along a travel path transverse to the conveyance path directions A and B. Movement of the conveyor 606 in either the A or B direction is, in some embodiments, performed by a reversible electric motor 610 which uses a belt 612 to transfer power to conveyor shaft 611. A separate motor drives the track engaging wheels (e.g., 614a, 614b, 614c) of vehicle 600 similar to operation of the vehicles 200 described previously.

Figure 12:
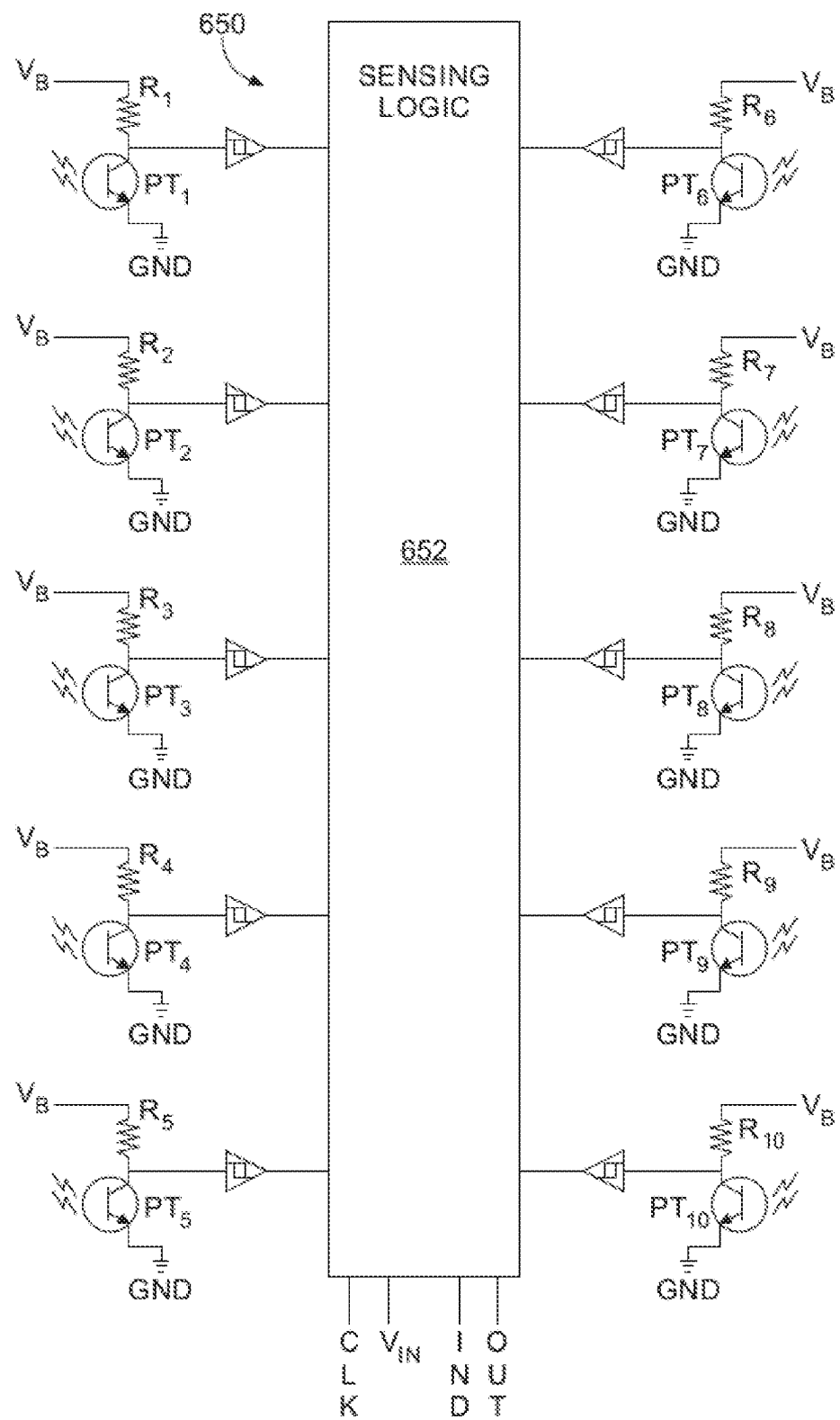
FIG. 12 is an electrical schematic depicting a circuit comprising phototransistors and state sensing logic and operative to signal a change in sensing state when an object traverses the detection plane of one of the object sensing arrangements of FIGS. 8-11.

FIG. 12 is an electrical schematic depicting a circuit 650 comprising photodetectors and state sensing logic and operative to signal a change in sensing state when an object traverses the detection plane or light curtain along which the phototransistors are arranged, in accordance with an exemplary embodiment of the present disclosure. In the exemplary embodiment of FIG. 12, the photodetectors are implemented as NPN phototransistors PT1 to PT10 in respective common emitter amplifier circuits.

The output of each common-emitter amplifier circuit is created by connecting a corresponding resistor (R1 to R10) between a voltage supply VB and the collector pin of the associated phototransistor. The values of resistors R1 to R10 are chosen to set the detection threshold (e.g. to discriminate between anticipated levels of ambient light at a given installation). A low value (a few thousand ohms) for the threshold resistors sets a high threshold level for the incident light to exceed before switching takes place (i.e, low sensitivity) while a high value sets a low threshold level (i.e, high sensitivity). Using, for example, the SFH3710 phototransistor manufactured by Osram Opto Semiconductors GmbH of Regensburg with a voltage VB on the order of 3.0 to 3.5 volts, under conditions normally applicable to an indoor warehouse environment, a resistance value for R1 to R10 on the order of 300 ohms may yield a circuit which is not impaired by noise or interference from ambient light sources such as indoor lighting. In addition, or alternatively, a filter which limits the light reaching the phototransistors to a relatively narrow (e.g, +/−2 nm) passband centered at a selected wavelength within the sensitivity envelope of the phototransistors (not shown) may also be used.

The sensing logic 652 may comprise any arrangement capable of quickly sensing the output of each photodetector and signal and/or process a state change indicative of a light curtain excursion. In one example consistent with the embodiment of FIG. 12, the output of each phototransistor circuit may be combined using combinatorial logic so that when the output of any one of the phototransistors falls below the sensitivity threshold, a change in state from "0" to "1" is output by the sensing logic 652. When the output of all phototransistors returns to a "0", a subsequent change in state from "1" to "0" is output by sensing logic 652. In an embodiment, the sensing logic 652 may comprise a field programmable gate array.

In other embodiments, the sensing logic may be implemented by a microprocessor which senses or samples the output of each respective photodetector during a corresponding clock cycle and initiates action in response to any of the photodetectors going from a high to a low state or vice versa and, in a subsequent cycle, when all of the photodetectors are once again all outputting a high state. In some embodiments, a vehicle such as the vehicle 600 of FIG. 11, may include a microprocessor which not only monitors the sensing arrangement(s), such as 602 and 604, but also controls the movements of the conveyor 406 and the vehicle itself.

Embodiments consistent with the present disclosure may employ sensing arrangements, such as the arrangement 500 of FIGS. 8-10, in conjunction with systems for conveying objects along a conveying path. Such systems define one or more object support surfaces and may further include one or more object transfer mechanisms respectively operative to move the object(s) supported by the object support surface in at least one object transfer direction. In some embodiments, the support surface(s) may be defined by surfaces of one or more belt conveyor(s), one or more roller conveyor (s), one or more tilting table(s), or one or more stationary tables. Where tilting or stationary tables are used, they may have perforations in fluid communication with a source of pressurized air to reduce friction during an object transfer operation.

Transfer of an object onto or from the object support surface(s) of a system constructed in accordance with embodiments of the present disclosure may be performed in a number of ways. By way of illustrative example, a pusher bar or other structure may apply positive forces moving the object onto, across, and/or from the object support surface. Alternatively, or in addition, an object supporting surface may itself be reoriented (e.g., tilted) by an object transfer mechanism such that an object moves, by gravity, onto another object support surface or into a bin or carton at a destination. By way of still further example, an object transfer mechanism may include a conveyor having, for example, a belt that defines the object support surface. In such embodiments, the belt may be driven in a first direction to transfer the object toward a first discharge end of the object transfer mechanism so that it may fall into, for example, a first waiting container. Similarly, the same belt may be driven in a second direction to transfer the object toward a second discharge end of the object transfer mechanism so that it may fall into, for example, a second waiting container.

In some embodiments, one or more object support surfaces of a material handling system and, optionally, one or more object transfer mechanisms, may be moved by a vehicle to an object transfer destination. In one embodiment, a conveyor equipped vehicle such as vehicle 600 of FIG. 11 may be used as part of a material handling system such as an apparatus for sorting objects into groupings of "n" items, for example. In one embodiment, "n" is equal to or greater than one and each grouping comprises the object(s) to be placed in a single shipping carton for shipment to a single customer as part of an order fulfillment process.

In some embodiments an object transfer cycle is initiated when the leading edge of an object enters a detection plane formed by a sensing arrangement such as sensing arrangement 500 of FIGS. 8-10, and an object transfer cycle is concluded when the trailing edge of the object exits the detection plane/light curtain. Completion of each cycle constitutes confirmation than the object has been transferred from the object supporting surface of vehicle 600 and into one of bins 119. The ability to accurately detect completion of each cycle for objects of varying shapes, sizes, and optical properties allows each vehicle to return to the charging and/or object transfer station 310 without the delays which might otherwise be experienced due to a detection failure. As well, the risk of a vehicle leaving a destination proximate one of bins 119 and/or leaving the loading station 130 before a transfer has been fully completed is also substantially reduced without regard to the shape and opacity of the objects involved.

Operation

The system 10 operates as follows. An item is processed at the induction station 50 to identify a characteristic of the item that is indicative of where the piece should be sorted. As described previously, the item may also be processed to determine whether the item is qualified to be transported by one of the vehicles based on physical characteristics of the item. The central controller maintains data that correlates various data to identify the destination bin or location for the items being processed.

As discussed previously, the induction station 50 may process the items automatically or manually. In a manual mode, the operator manually enters information regarding a piece and then drops the piece on a conveyor. The system electronically tags the piece with the sort information and the conveyor conveys the piece toward the loading station. Alternatively, if the input system is an automated system, the piece is automatically scanned to identify the relevant sort characteristic. For instance, the input station may use a scanner, such as a bar code scanner to read the bar code on a piece, or the input station may include an imaging device, such as a high speed line scan camera in combination with an OCR engine to read information on the piece.

To prepare to receive an item, a vehicle 200 moves along the track toward the loading station 310 in the loading column 300. When the vehicle 200 moves into position at the loading station 310 the home sensor detects the presence of the vehicle and sends a signal to the central processor 350 indicating that the vehicle is positioned at the loading station.

Once the vehicle is positioned at the loading station, the input station conveys an item onto the vehicle. As the item is being conveyed onto the vehicle 200, the loading mechanism 210 on the vehicle loads the item onto the vehicle. Specifically, the input station conveys the item into contact with the conveyor belts 212 on the vehicle. The conveyor belts 212 rotate toward the rearward side of the vehicle, thereby driving the item rearwardly on the vehicle.

The operation of the conveyor belts is controlled by the loading sensors 260, 262. The forward loading sensor detects the leading edge of the item as the item is loaded onto the vehicle. Once the forward loading sensor 260 detects the trailing edge of the item, a controller onboard the vehicle determines that the item is loaded on the vehicle and stops the conveyor motor. Additionally, the onboard controller may control the operation of the conveyor in response to signals received from the rearward sensor 262. Specifically, if the rearward sensor 262 detects the leading edge of the item, then the leading edge of the item is adjacent the rearward edge of the vehicle. To ensure that the item does not overhang from the rearward edge of the vehicle, the controller may stop the conveyor once the rearward sensor detects the leading edge of the item. However, if the rearward sensor detects the leading edge of the item before the forward sensor detects the trailing edge of the item, the controller may determine that there is a problem with the item (i.e. it is too long or two overlapping items were fed onto the vehicle. In such an instance, the system may tag the piece as a reject and discharge the item to the reject bin 325 positioned behind the loading station. In this way, if there is an error loading an item onto a vehicle, the item can simply be ejected into the reject bin, and a subsequent item can be loaded onto the vehicle.

After an item is loaded onto the vehicle, the vehicle moves away from the loading station. Specifically, once the onboard controller detects that an item is properly loaded onto the vehicle, the onboard controller sends a signal to start the drive motor 250. The drive motor 250 rotates the axles, which in turn rotates the gears 222 on the wheels 220. The gears 222 mesh with the drive surface 156 of the vertical rails 305 in the loading column to drive the vehicle upwardly. Specifically, the gears and the drive surfaces mesh and operate as a rack and pinion mechanism, translating the rotational motion of the wheels into linear motion along the track 110.

Since the vehicles move up the loading column from the loading station, the destination for the vehicle does not need to be determined until after the vehicle reaches the first gate along the upper rail 135. For instance, if an automated system is used at the induction station 50 to scan and determine the characteristic used to sort the items, it may take some processing time to determine the relevant characteristic and/or communicate that information with a central controller to receive destination information. The time that it takes to convey the item onto the vehicle and then convey the vehicle up the loading column will typically be sufficient time to determine the relevant characteristic for the item. However, if the characteristic is not determined by the time the vehicle reaches the upper rail, the system may declare that the item is not qualified for sorting and the vehicle may be directed to the re-induction station 430 to discharge the item onto the discharge assembly 410. From the re-induction station 430, the vehicle travels down the second column to the lower rail 140, and then back to the loading column.

Once the item is qualified for sorting, the central controller 350 determines the appropriate bin 190 for the item. Based on the location of the bin for the item, the route for the vehicle is determined. Specifically, the central controller determines the route for the vehicle and communicates information to the vehicle regarding the bin into which the item is to be delivered. The central controller then controls the gates along the track to direct the vehicle to the appropriate column. Once the vehicle reaches the appropriate column the vehicle moves down the column to the appropriate bin. The vehicle stops at the appropriate bin 190 and the onboard controller sends an appropriate signal to the conveyor motor 255 to drive the conveyor belts 212, which drives the item forwardly to discharge the item into the bin. Specifically, the top of the vehicle aligns with the gap between the appropriate bin 190 and the bottom edge of the bin that is immediately above the appropriate bin.

In the present instance, the orientation of the vehicles does not substantially change as the vehicles move from travelling horizontally (along the upper or lower rails) to vertically (down one of the columns). Specifically, when a vehicle is travelling horizontally, the two front geared wheels 220 cooperate with the upper or lower horizontal rail 135 or 140 of the front track 115, and the two rear geared wheels 220 cooperate with the corresponding upper or lower rail 135 or 140 of the rear track 120. As the vehicle passes through a gate and then into a column, the two front geared wheels engage a pair of vertical legs 130 in the front track 115, and the two rear geared wheels engage the corresponding vertical legs in the rear track 120.

As the vehicle travels from the horizontal rails to the vertical columns or from vertical to horizontal, the tracks allow all four geared wheels to be positioned at the same height. In this way, as the vehicle travels along the track it does not skew or tilt as it changes between moving horizontally and vertically.

Traffic Control

Since the system includes a number of vehicles 200, the system controls the operation of the different vehicles to ensure the vehicles do not collide into one another. In the following discussion, this is referred to as traffic control. Exemplary methodologies for controlling the flow of traffic are described in U.S. Pat. No. 7,861,844.

In the present instance, some of the columns may have two vertical rails 130 that are independent from the adjacent columns. For instance, the loading column 300 has two independent rails that are not shared with the adjacent column. Therefore, vehicles can travel up the loading column without regard to the position of vehicles in the column next to the loading column. Furthermore, as shown in FIG. 5, it may be desirable to configure the column next to the loading column so that it also has two independent vertical rails. In this way, vehicles can more freely travel up the loading column and down the adjacent column.

In the foregoing discussion, the sorting of items was described in relation to an array of bins disposed on the front of the sorting station 100. However, as illustrated in FIGS. 3-4, the number of bins in the system can be doubled by attaching a rear array of bins on the back side of the sorting station. In this way, the vehicles can deliver items to bins on the front side of the sorting station by traveling to the bin and then rotating the conveyor on the vehicle forwardly to eject the piece into the front bin. Alternatively, the vehicles can deliver items to bins on the rear side of the sorting station by traveling to the bin and then rotating the conveyor on the vehicle rearwardly to eject the piece into the rear bin. Additionally, the sorting station 100 is modular and can be readily expanded as necessary simply by attaching an additional section to the left end of the sorting station.

Vehicle Control Based on Item Characteristic(s)

1. Vehicle Movement Profile

As discussed previously, one or more characteristics of an item being transported by a vehicle may be detected or determined for the item during processing. This detected information can be used to control the further processing of the item. In particular, the control of the vehicle between the loading station 310 and the destination bin 190 may be varied in response to the detected information. More specifically, the movement of the vehicle along the track may be varied in response to the detected characteristic(s).

A variety of movement variables for the vehicle may be varied based on the detected information. The list of movement variables includes, but is not limited to: acceleration profile (i.e. how rapidly the vehicle accelerates), braking profile (i.e. how rapidly the vehicle brakes) and cornering speed (i.e. how fast the vehicle goes around corners). Another manner in which the vehicle may be controlled in response to the detected information is the manner in which items are ejected from the vehicle. In particular, the belt speed of the vehicle may be increased or decreased to vary the speed with which an item is ejected.

By way of example, the system may have a default control profile that is used to control the movement of the vehicles along the track. Under the default profile, the vehicle moves along the track at first peak velocity, accelerating at a first rate and braking at a first rate. Additionally, under the default movement profile, the vehicle has a first peak speed as the vehicle travels around a curve from horizontal to vertical or from vertical to horizontal. The default profile may apply to a variety of items having a series of characteristics that fit within a default characteristic profile, such as flat items having a reasonable weight (.e.g. a book, a box weighing a few ounces or more, etc.). However, if the system detects a characteristic that varies from the default characteristic profile, the system may vary the control of the vehicle movement. In particular, the system may control the movement according to a second movement profile. For example, if the system detects that an element is cylindrical the system may control the vehicle according to a movement profile that is different than the default profile. The vehicle may accelerate more slowly than the default profile to reduce the likelihood of the item rolling on the vehicle. Similarly, the vehicle may brake more slowly and may travel around corners at a slower rate to reduce the likelihood of the item rolling on the vehicle.

As discussed above, the control of the vehicle may be controlled according to a movement profile and the movement profile may vary based on one or more characteristics determined for the item to be conveyed by the vehicle. It should be understood that the system may store a number of movement profiles, each of which controls the movement of the vehicle along the track according to different parameters. Each movement profile may correlate to one or more characteristics of a particular item. In this way, a variety of items having one or more shared characteristic may share the same movement profile. For instance, all fragile non-round items may all share the same movement profile and all fragile round or cylindrical items may all share the same movement profile.

In this way, the system can dynamically control the movement of each vehicle based on one or more characteristic determined for each item being carried by each vehicle. The characteristic can be determined by either directly detecting the characteristic (scanning, weighing, measuring etc.) or the characteristic(s) may be stored in a central database and the characteristic(s) are determined by identifying the item, such as by a product code. In addition to or instead of storing information about the characteristics for an item, the database may simply include data that identifies the movement profile to be used for an item. In such an instance, the system or operator scans an item to detect a product identification characteristic (such as a bar code or other identifying information). The vehicle movement profile is identified in the central base for the item so that the system retrieves the vehicle movement profile data from the central database after the item is identified.

2. Vehicle Destination Control

As discussed above, the system can control the movement of the vehicle based on detected or determined information about the item being conveyed on the vehicle. Additionally, the destination of the vehicle may be varied based on one or more characteristic(s) of an item. For instance, information regarding the physical characteristics of various items may be stored in a central data base. By scanning an item for a product identification code the system can retrieve the data regarding the physical characteristics of the item from the central data base. This data is the expected physical characteristics for the item. For example, based on the data stored for a product identification code, the item may be expected to be 5" long, 3" wide and weigh 8 ounces. If the scanning station 80 measures the item to be 8" long and/or weigh 16 ounces, the system may modify the destination for the item. Specifically, based on the scanned product code the system may direct the vehicle to deliver the item to bin "X". However, when the system detects a physical characteristic that does not match the expected characteristic the system may alter the destination bin. In the example above, if the item is scanned and weigh 16 ounces, the system may deliver the item to bin "y", which may be an alternate larger bin or may be an outsort or reject bin for receiving items that vary from the expected physical characteristic.

3. Vehicle Delivery Control

The system may also control how an item is discharged or delivered at an output bin 190 based on the determined or detected physical characteristics of an item. If an item is fragile, the system may control the vehicle so that the conveyor belts rotate more slowly to discharge the item into the output bin more slowly. Additionally or alternatively, the position of the vehicle relative to the output bin may be varied based on the detected or determined characteristic. For example, if an item is fragile, the system may stop the vehicle lower relative to the bin so that the item is closer to the bottom of the bin and therefore has less of a vertical fall when the item is discharged into the bin.

Referring now to FIGS. 9 and 10, when multiple items are to be delivered to the same output bin 190, the system may control the position of the vehicle 200 relative to the output bin 190 to reduce the distance that the items must fall when being discharged and to reduce the likelihood of the items causing a jam as the items stack on top of one another. The control of the position of the vehicle during delivery may be varied depending on the detected or determined characteristic(s) of one or more of the items being sorted to the delivery bin.

As shown in FIGS. 9 and 10 when multiple items are to be delivered to a single bin, the system may divide the single output bin into three virtual sort destinations. The system then sorts the three items to the three virtual sort locations. For instance, as shown in FIG. 9, when viewed from the front, the output bin 190 may be segmented into three virtual sort locations: location 1, location 2, and location 3. In FIG. 9 the single output bin is divided into three virtual locations having equal height. However, the size of each virtual location may be varied based on one or more characteristic determined or detected for an item. Additionally, the virtual locations can be prioritized based on the determined or detected characteristic(s) of the items. For instance, if a plurality of items are to be delivered to an output bin and one of the items is fragile and one of the items is heavy and/or dense, the system may prioritize the virtual locations by prioritizing the heavy item to be delivered into the bin first and the fragile item is delivered into the bin second to minimize the likelihood of damage. In order to prioritize the order of delivery, the system may control the flow of vehicles to stage or delay the vehicle transporting the fragile item.

Similarly, rather than virtually split a single output bin into a plurality of sort locations, the system may virtually merge a plurality of bins into a single virtual bin based on the characteristics determined or detected for multiple items in an order. For instance, if multiple items are to be delivered to a single output bin, but the physical attributes of the different items dictates the order in which the items should be placed into the bin, the system may deliver the items to two or more bins (preferably adjacent bins). The items are then sorted to the different bins. Returning again to the example of a first item that is fragile and a second item that is heavy, when the system detects or determines these features, the system may dynamically reassign the delivery of the items to two separate output bins rather than a single bin if the fragile item is delivered to the output bin before the vehicle with the second item reaches the output bin. After the two items are delivered to two separate bins, the system provides a signal to the operator indicating that the items in the two separate bins should be withdrawn together and treated as a single order rather than being two separate orders.

When an output bin is separated into multiple sort locations as shown in FIG. 9, the system may control the operation of the vehicles to vary the position of the vehicle relative to the output bin. For instance, referring to FIG. 10, when the vehicle carrying the first item to the output bin arrives at the output bin, the system controls the vehicle to advance the vehicle into alignment with the lowest location for the output bin (e.g. Location 1 in FIG. 10) and the item is ejected into the bin so that the first item is on the bottom of the bin. The vehicle carrying the second item to be delivered to the output bin is then advanced so that the vehicle is aligned with the next lowest location of the output bin (i.e. Location 2) and the vehicle ejects the item into the bin so that the second item is placed onto the first item. Finally, the vehicle carrying the third item to be delivered to the output bin is then advanced so that the vehicle is aligned with the highest location of the output bin (i.e. Location 3) so that the third item is ejected on the first and second items.

As shown in FIG. 10, the rear wall of the output bin 190 may be open so that the vehicles can discharge items through the back of the output bin at varying heights along the height of the output bin. However, it should be appreciated that rather than having an open back wall, the back wall may be displaceable or collapsible to allow the vehicles to stop at varying positions along the height of the output bin and discharge items into the bin.

As described above, various parameters of how an item is delivered to an output bin may be varied based on the physical characteristic(s) determined or detected for an item. Additionally, the system may include additional elements that are optionally used during delivery based on the determined or detected characteristics for the items. For example, the vehicles may include a separate extendable belt or the conveyor belts 212 may be mounted onto a carriage that can be displaced relative to the wheels of the vehicle so that the conveyor belts can extend or telescope outwardly toward the output bin. Specifically, the conveyor belts may extend into the output bin and the conveyor belts can the rotate forwardly to discharge the belt into the output bin. Be extending the conveyor belts into the output bin the item drops less when it is delivered into the output bin. Additionally, the conveyor belt may be controlled so that the conveyor belt does not start until the conveyor belt is completely extended into the output bin. The conveyor belt is rotated to discharge the item. While the conveyor belt is rotating, the conveyor belt is retracted toward the vehicle. The simultaneous operation of discharging the item while withdrawing the belt drops the item more gently into the output bin.

Alternatively, rather than utilizing an extendable conveyor belt, the system may selectively utilize a chute at the output bin in response to the detection or determination of a physical characteristic of an item. Specifically, in response to detection or determination of an item having a select characteristic, the system may advance the vehicle to a particular output bin. A chute may be mounted on the rack and the vehicle may drive the chute so that the item is discharged down the chute into the output bin.

It will be recognized by those skilled in the art that changes or modifications may be made to the above-described embodiments without departing from the broad inventive concepts of the invention. For instance, in the foregoing discussion the system is described as a series of vehicles guided by a track. However, it should be understood that the system need not include a track. For example, the vehicles may travel along the ground rather than traveling along a track. The vehicles may be guided along the ground by one or more sensors and/or a controller. Optionally, the vehicles may be guided in response to signals from other vehicles and/or from a central controller, such as a computer that monitors each of the vehicles and controls movement of the vehicles to prevent the vehicles from colliding with one another. Additionally, the central controller may provide signals to direct each vehicle along a path to a storage location or transfer location.

In addition to a system in which the vehicles move along the ground without a track, the system may incorporate a guidance assembly that includes one or more rails or other physical guides that contact a mechanism on the vehicle to direct the vehicle along a path. For instance, the vehicles may each include one or more contact elements such as wheels, rollers, guide tabs, pins or other elements that may engage the guidance assembly. The guidance assembly mail be a linear element such as a straight rail or it may be a curved element. The guidance assembly may curve within a horizontal plane so that the rail stays within a plane or the guide may curve vertically so that the rail is within a single plane. The guidance assembly may include a plurality of guides or rails vertically spaced from one another so that the vehicles may move horizontally at a plurality of vertical levels. The guide may also include an elevator for moving the vehicles between the vertically spaced rails.

As can be seen from the above, the system may be incorporated into a variety of systems that use physical guide mechanisms or guide the vehicles along open areas by directing the path to guide the vehicles to storage locations or transfer locations. As discussed above, the movement of each vehicle may be controlled in response to a determination of one or more physical characteristics of the item carried by each respective vehicle.

The systems and methods described herein may be implemented in software, hardware, or a combination thereof, in different embodiments. In addition, the order of methods may be changed, and various elements may be added, reordered, combined, omitted or otherwise modified. All examples described herein are presented in a non-limiting manner. Various modifications and changes may be made as would be obvious to a person skilled in the art having benefit of this disclosure. Realizations in accordance with embodiments have been described in the context of particular embodiments. These embodiments are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow.

It should therefore be understood that this invention is not limited to the particular embodiments described herein, but is intended to include all changes and modifications that are within the scope and spirit of the invention as set forth in the claims.

The invention claimed is:

1. An apparatus for sorting a plurality of items, comprising:
   a first group of sort destinations positioned along a first track;
   a second group of sort destinations positioned along a second track, wherein the second track is spaced apart from the first track to form an aisle between the first and second track;
   a plurality of delivery vehicles vertically and horizontally displaceable within the aisle for delivering items to the sort destinations;
   an input station comprising a qualification station configured to analyze an item to detect a first characteristic of the item indicative of the sort destination to which the item is to be sorted and a second characteristic of the item;
   a conveyor for conveying items from the qualification station to a loading station where items are loaded onto the delivery vehicles;
   a recirculation path providing a path along which the item can be transported back toward the input station, wherein the recirculation path has a first end positioned along the first or second track such that the delivery vehicles move vertically upwardly from the loading station to reach the first end of the recirculation path;
   a reject area positioned adjacent the loading station;
   a controller for controlling operation of the delivery vehicles, wherein the controller is configured to selectively direct items to one of three locations in response to a combination of the first and second characteristics, wherein the three locations comprise the reject bin, the recirculation path and one of the sort destinations;
   wherein the first characteristic is a product identification code and the second characteristic is a physical characteristic and wherein the controller is configured to control the delivery vehicles in response to receiving signals from the input station so that: i) items not having the second characteristic are directed to the reject bin, ii) items for which the first characteristic is not detected and for which the second characteristic is detected are directed upwardly to the recirculation path, and iii) items for which the first characteristic is detected and for which the second characteristic is detected are directed upwardly to the sort destinations.

2. The apparatus of claim 1 wherein the controller is configured to determine the sort location to which an item is to be directed based on the product identification code determined for the item and the second characteristic detected for the item.

3. The apparatus of claim 1 wherein the reject area is positioned vertically lower than the first end of the recirculation path.

4. The apparatus of claim 1 wherein the recirculation path comprises a roller bed or conveyor belt.

5. The apparatus of claim 1 wherein the reject area is positioned adjacent the input station so that the delivery vehicles are operable to discharge items into the reject area without moving from the input area.

6. The apparatus of claim 1 comprising one or more displaceable guide elements configured to selectively guide the delivery vehicles to the sort destinations.

7. The apparatus of claim 6 wherein the displaceable guide elements comprise gates configured to selectively direct the delivery vehicles between horizontal and vertical sections of the track.

8. The apparatus of claim 1 wherein the second characteristic is length and wherein the controller is configured to direct items to the reject area that have a length exceeding a predetermined length and the controller is configured to selectively direct items to the recirculation path that have a length less than or equal to the predetermined length.

9. The apparatus of claim 1 wherein the track comprises a path from the loading station to the recirculation path wherein the path from the loading station to the recirculation path includes a vertical portion directing delivery vehicles upwardly between the loading station and the recirculation path.

10. A method for sorting a plurality of items to a plurality of sort locations, comprising the steps of:
conveying items from an input area to a loading area;
scanning the items to detect a first characteristic of the items;
scanning the items between the input area and the loading area to detect a second characteristic of the items;
loading each item on an independently operable vehicle that is moveable along a vertical loop of track in an aisle between a first set of sort locations and a second set of sort locations;
selectively operating the vehicles to direct items to a reject area adjacent the loading area in response to not detecting the second characteristic during the step of scanning the items to detect a second characteristic;
selectively operating one of the vehicles to raise an item above the height of the input area in response to detecting the second characteristic during the step of scanning the item to detect a second characteristic;
selectively operating the one vehicle to convey the item to a recirculation path after the step of selectively operating the one vehicles to raise the item, wherein the step of selectively operating the one vehicles to convey the item to a recirculation path is in response to not detecting the first characteristic during the step of scanning the item to detect a first characteristic;
selectively operating the one vehicle to convey the item to one of the sort destinations after the step of selectively operating the one vehicle to raise the item in response to detecting the first characteristic during the step of scanning the item to detect a first characteristic and detecting the second characteristic during the step of scanning the item to detect a second characteristic; and
conveying the item along the recirculation path toward the input area if the item is conveyed to the recirculation path.

11. The method of claim 10 comprising the step of scanning the item between the input area and the loading area a second time after the step of selectively operating the one vehicle to convey the item to a recirculation path.

12. The method of claim 10 comprising the step of selectively operating the vehicle to convey the item to a reject area in response to detecting a lack of the second characteristic.

13. The method of claim 12 wherein the step of selectively operating the vehicles to direct items to a reject area a comprises conveying the item without vertically displacing the vehicle.

14. An apparatus for sorting a plurality of items, comprising:
a group of sort destinations wherein each sort destination is configured to receive one or more items;
a first track, wherein the plurality of sort destinations are positioned along the first track;
a second spaced apart from the first track to form an aisle between the first and second track;
a plurality of delivery vehicles vertically and horizontally displaceable within the aisle for delivering items to the sort destinations;
an input station comprising a qualification station configured to analyze an item to detect a first characteristic of the item indicative of the sort destination to which the item is to be sorted and a second characteristic of the item;
a conveyor for conveying items from the qualification station to a loading station where items are loaded onto the delivery vehicles;
a recirculation path providing a path along which the item can be transported back toward the input station, wherein the recirculation path has an entrance along the first or second tracks such that the delivery vehicles move upwardly from the loading station to reach the recirculation path;
a reject area positioned adjacent the loading station;
a controller for controlling operation of the delivery vehicles, wherein the controller is configured to selectively identify items as qualified for delivery in response to detection of the second characteristic and to selectively identify item as not qualified for delivery if the second characteristic is not present,
wherein the controller is configured to direct items identified as not qualified for delivery to the reject bin; and
wherein the controller is configured to control the delivery vehicles carrying items identified as qualified for delivery so that such delivery vehicles drive upwardly away from the loading station;
wherein the controller is configured to control the delivery vehicles carrying items identified as qualified for delivery so that such delivery vehicles carrying an item for which the first characteristic is detected are directed to one of the sort locations and delivery vehicles carrying an item for which the first characteristic are not detected are directed to the entrance of the recirculation path and displaced toward the recirculation path.

15. The apparatus of claim 14 wherein the second characteristic is length and wherein the controller is configured to direct items to the reject area that have a length exceeding a predetermined length and the controller is configured to selectively direct items to the recirculation path that have a length less than or equal to the predetermined length.

16. The apparatus of claim 14 wherein the track comprises a path from the loading station to the recirculation path wherein the path from the loading station to the recirculation path includes a vertical portion directing delivery vehicles upwardly between the loading station and the recirculation path.

* * * * *